United States Patent
Khan et al.

(10) Patent No.: US 10,282,330 B2
(45) Date of Patent: May 7, 2019

(54) CONFIGURABLE LOGIC PLATFORM WITH MULTIPLE RECONFIGURABLE REGIONS

(71) Applicant: Amazon Technologies, Inc., Seattle, WA (US)

(72) Inventors: Asif Khan, Cedar Park, TX (US); Islam Mohamed Hatem Abdulfattah Mohamed Atta, Vancouver (CA); Robert Michael Johnson, Austin, TX (US); Mark Bradley Davis, Austin, TX (US); Christopher Joseph Pettey, Woodinville, WA (US); Nafea Bshara, San Jose, CA (US); Erez Izenberg, Tel-Aviv (IL)

(73) Assignee: Amazon Technologies, Inc., Seattle, WA (US)

( * ) Notice: Subject to any disclaimer, the term of this patent is extended or adjusted under 35 U.S.C. 154(b) by 245 days.

(21) Appl. No.: 15/280,624

(22) Filed: Sep. 29, 2016

(65) Prior Publication Data

US 2018/0089119 A1    Mar. 29, 2018

(51) Int. Cl.
| | |
|---|---|
| *G06F 15/18* | (2006.01) |
| *G06F 13/362* | (2006.01) |
| *G06F 13/40* | (2006.01) |
| *G06F 9/50* | (2006.01) |

(52) U.S. Cl.
CPC ......... *G06F 13/362* (2013.01); *G06F 9/5077* (2013.01); *G06F 13/4068* (2013.01)

(58) Field of Classification Search
None
See application file for complete search history.

(56) References Cited

U.S. PATENT DOCUMENTS

| | | | |
|---|---|---|---|
| 6,011,407 | A | 1/2000 | New |
| 6,785,816 | B1 | 8/2004 | Kivimaki et al. |
| 6,802,026 | B1 | 10/2004 | Patterson |

(Continued)

FOREIGN PATENT DOCUMENTS

| | | |
|---|---|---|
| WO | WO 02/01425 | 1/2002 |
| WO | WO 2013/158707 | 10/2013 |
| WO | WO 2015/042684 | 4/2015 |

OTHER PUBLICATIONS

Chen et al., "Enabling FPGAs in the Cloud," Proceedings of the 11th ACM Conference on Computing Frontiers, May 2014, pp. 1-10.
Eguro et al., "FPGAs for trusted cloud computing," 2012 22nd International Conference on Field Programmable Logic and Applications, Aug. 2012, pp. 63-70.

(Continued)

*Primary Examiner* — Cheng Yuan Tseng
(74) *Attorney, Agent, or Firm* — Klarquist Sparkman, LLP

(57) ABSTRACT

The following description is directed to a configurable logic platform. In one example, a configurable logic platform includes host logic and a plurality of reconfigurable logic regions. Each reconfigurable region can include hardware that is configurable to implement an application logic design. The host logic can be used for separately encapsulating each of the reconfigurable logic regions. The host logic can include a plurality of data path functions where each data path function can include a layer for formatting data transfers between a host interface and the application logic of a corresponding reconfigurable logic region. The host interface can be configured to apportion bandwidth of the data transfers generated by the application logic of the respective reconfigurable logic regions.

20 Claims, 9 Drawing Sheets

(56) References Cited

U.S. PATENT DOCUMENTS

| | | | |
|---|---|---|---|
| 6,826,717 | B1 | 11/2004 | Draper et al. |
| 7,177,961 | B2* | 2/2007 | Brice, Jr. ............... G06F 21/606 710/36 |
| 7,716,497 | B1 | 5/2010 | Timberger |
| 7,739,092 | B1 | 6/2010 | Ballagh et al. |
| 8,145,894 | B1 | 3/2012 | Casselman |
| 8,516,272 | B2 | 8/2013 | Hofstee et al. |
| 8,621,597 | B1 | 12/2013 | Jenkins, IV |
| 8,626,970 | B2* | 1/2014 | Craddock ............... G06F 9/468 710/64 |
| 8,881,141 | B2* | 11/2014 | Koch ................. G06F 9/45558 718/1 |
| 9,038,072 | B2 | 5/2015 | Nollet et al. |
| 9,098,662 | B1 | 8/2015 | Chin et al. |
| 9,104,453 | B2* | 8/2015 | Anand ............... G06F 9/45533 |
| 9,141,747 | B1 | 9/2015 | Orthner |
| 9,218,195 | B2* | 12/2015 | Anderson ........... G06F 9/45558 |
| 9,298,865 | B1 | 3/2016 | Peng |
| 9,483,639 | B2 | 11/2016 | Sliwa et al. |
| 9,684,743 | B2 | 6/2017 | Larzul |
| 2004/0236556 | A1 | 11/2004 | Lin |
| 2008/0028186 | A1 | 1/2008 | Casselman |
| 2013/0145431 | A1 | 6/2013 | Kruglick |
| 2014/0351811 | A1 | 11/2014 | Kruglick |
| 2014/0380025 | A1 | 12/2014 | Kruglick |
| 2015/0227662 | A1 | 8/2015 | Lepercq |
| 2018/0088174 | A1 | 3/2018 | Davis et al. |
| 2018/0088992 | A1 | 3/2018 | Davis et al. |
| 2018/0089343 | A1 | 3/2018 | Atta |
| 2018/0091484 | A1 | 3/2018 | Atta et al. |
| 2018/0095670 | A1 | 4/2018 | Davis et al. |
| 2018/0095774 | A1 | 4/2018 | Atta et al. |

OTHER PUBLICATIONS

Eslami et al., "Enabling Effective FPGA Debug Using Overlays: Opportunities and Challenges," 2nd International Workshop on Overlay Architectures for FPGAs, Jun. 2016, pp. 1-6.

Fahmy et al., "Virtualized FPGA Accelerators for Efficient Cloud Computing," 2015 IEEE 7th International Conference on Cloud Computing Technology and Science, 2015, pp. 430-435.

International Search Report and Written Opinion for PCT/US2017/054179, dated Jan. 10, 2018, 12 pages.

"SDAccel Development Environment," Xilinx, Inc., document downloaded from http://www.xilinx.com/products/design-tools/software-zone/sdaccel.html on Jul. 25, 2016, 9 pages.

Weerasinghe et al., "Enabling FPGAs in Hyperscale Data Centers," 2015 IEEE 12th International Conference on Ubiquitous Intelligence and Computing, 2015 IEEE 12th International Conference on Autonomic and Trusted Computing, and 2015 IEEE 15th Conference on Scalable Computing and Communications and ITS Associated Workshops, Aug. 2015, pp. 1078-1086.

Zazo et al., "A PCIe DMA engine to support the virtualization of 40 Gbps FPGA-accelerated network appliances," 2015 IEEE International Conference on Reconfigurable Computing and FPGAS, Dec. 2015, pp. 1-6.

Byma et al., "FPGAs in the Cloud: Booting Virtualized Hardware Accelerators with OpenStack," *2014 IEEE 22nd Annual International Symposium on Field-Programmable Custom Computing Machines*, pp. 109-116, May 2014.

"SDAccel Development Environment User Guide," *Xilinx, Inc.*, 85 pages, 2016.

"The Xilinx SDAccel Development Environment Bringing the Best Performance/Watt to the Data Center," *Xilinx, Inc.*, 6 pages, 2014.

\* cited by examiner

CONFIGURABLE LOGIC PLATFORM WITH MULTIPLE RECONFIGURABLE REGIONS

BACKGROUND

Cloud computing is the use of computing resources (hardware and software) which are available in a remote location and accessible over a network, such as the Internet. In some arrangements, users are able to buy these computing resources (including storage and computing power) as a utility on demand. Cloud computing entrusts remote services with a user's data, software and computation. Use of virtual computing resources can provide a number of advantages including cost advantages and/or the ability to adapt rapidly to changing computing resource needs.

The users of large computer systems may have diverse computing requirements resulting from different use cases. A cloud or compute service provider can provide various different computer systems having different types of components with varying levels of performance and/or functionality. Thus, a user can select a computer system that can potentially be more efficient at executing a particular task. For example, the compute service provider can provide systems with varying combinations of processing performance, memory performance, storage capacity or performance, and networking capacity or performance. The focus of the cloud service provider is to provide generalized hardware that can be shared by many different customers. The cloud service provider can be challenged to provide specialized computing hardware for users while keeping a healthy mix of generalized resources so that the resources can be efficiently allocated among the different users.

DETAILED DESCRIPTION

Figure 1:
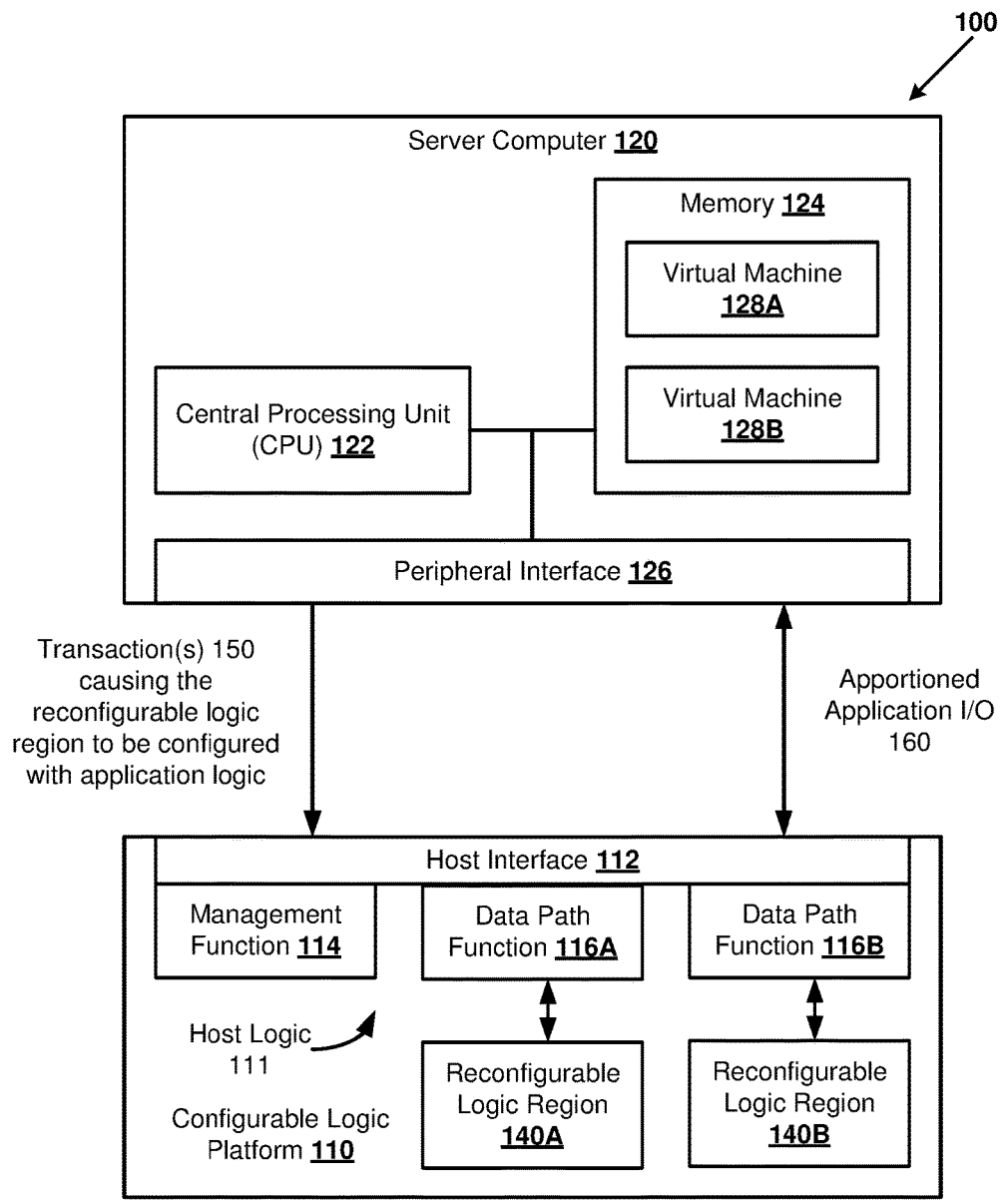
FIG. 1 is a system diagram showing an example of a system including a configurable logic platform.

Some users may desire to use hardware that is proprietary or highly specialized for executing the computing tasks. One solution for providing specialized computing resources within a set of reusable general computing resources is to provide a server computer comprising a configurable logic platform (such as by providing a server computer with an add-in card including a field-programmable gate array (FPGA)) as a choice among the general computing resources. As used herein, the terms configurable logic platform and configurable hardware platform are interchangeable. Configurable logic is hardware that can be programmed or configured to perform a logic function that is specified by configuration data that is applied to or loaded on the configurable logic. For example, a user of the computing resources can provide a specification (such as source code written in a hardware description language) for configuring the configurable logic, the configurable logic can be configured according to the specification, and the configured logic can be used to perform a task for the user. However, allowing a user access to low-level hardware of the computing facility can potentially introduce security and privacy issues within the computing facility. As a specific example, a faulty or malicious design from one user could potentially cause a denial of service to other users if the configured logic caused one or more server computers within the computing facility to malfunction (e.g., crash, hang, or reboot) or be denied network services. As another specific example, a faulty or malicious design from one user could potentially corrupt or read data from another user if the configured logic is able to read and/or write memory of the other user's memory space. As another specific example, a faulty or malicious design from a user could potentially cause the configurable logic platform to malfunction if the configured logic includes a circuit (such as a ring oscillator) that causes the device to exceed a power consumption or temperature specification of the configurable logic platform.

As described herein, a compute services facility can include a variety of computing resources, where one type of the computing resources can include a server computer comprising a configurable logic platform. The configurable logic platform can be programmed or configured by a user of the computer system so that hardware (e.g., the configurable logic) of the computing resource is customized by the user. For example, the user can program the configurable logic so that it functions as a hardware accelerator that is tightly coupled to the server computer. As a specific example, the hardware accelerator can be accessible via a local interconnect, such as Peripheral Component Interconnect Express (PCI-Express or PCIe), of the server computer. The user can execute an application on the server computer and tasks of the application can be performed by the hardware accelerator using PCIe transactions. By tightly coupling the hardware accelerator to the server computer, the latency between the accelerator and the server computer can be reduced which can potentially increase the processing speed of the application.

In one embodiment, the configurable logic platform can be programmed or configured by multiple users of the computer system so that the configurable hardware can accelerate the applications of multiple users that are sharing the computing resource. When multiple users share the resource, additional privacy, security, and availability concerns can be introduced. For example, one user could potentially throttle another user by consuming an unfair share of the bandwidth between a CPU of the server computer and the configurable logic platform. As another example, one user could potentially throttle another user by consuming an unfair share of any shared resources of the configurable logic platform. As another example, one user could potentially monitor the activity of another user by observing response times or other performance measures of the configurable logic platform.

The compute services provider can potentially increase the privacy, security, and/or availability of the computing resources by wrapping or encapsulating each user's hardware accelerator (also referred to herein as application logic) within host logic of the configurable logic platform. Encapsulating the application logic can include limiting or restricting the application logic's access to configuration resources, physical interfaces, hard macros of the configurable logic platform, and various peripherals of the configurable logic platform. For example, the compute services provider can manage the programming of the configurable logic platform so that it includes both the host logic and the application logic. The host logic can provide a framework or sandbox for the application logic to work within. In particular, the host logic can communicate with the application logic and constrain the functionality of the application logic. For example, the host logic can perform bridging functions between the local interconnect (e.g., the PCIe interconnect) and the application logic so that the application logic cannot directly control the signaling on the local interconnect. The host logic can be responsible for forming packets or bus transactions on the local interconnect and ensuring that the protocol requirements are met. By controlling transactions on the local interconnect, the host logic can potentially prevent malformed transactions or transactions to out-of-bounds locations. As another example, the host logic can isolate a configuration access port so that the application logic cannot cause the configurable logic platform to be reprogrammed without using services provided by the compute services provider. As another example, the host logic can manage the burst size and bandwidth over the local interconnect and to internal resources of the configurable logic platform to potentially increase determinism and quality of service. By apportioning bandwidth to the local interconnect and to the internal resources, each user can receive more deterministic performance and one customer cannot directly or indirectly determine if another customer is sharing resources of the configurable logic platform.

FIG. 1 is a system diagram showing an example of a computing system 100 including a configurable logic platform 110 and a server computer 120. For example, the server computer 120 can be used to execute application programs for multiple end-users. Specifically, the server computer 120 can include one or more central processing units (CPUs) 122, memory 124, and a peripheral interface 126. The CPU 122 can be used to execute instructions stored in the memory 124. For example, each end-user can be executing a different virtual machine 128A-B that is loaded in the memory 124 and managed by a hypervisor or operating system kernel. Each of the virtual machines 128A-B can be loaded with different application programs and the CPU 122 can execute the instructions of the application programs. Each application program can communicate with a hardware accelerator of the configurable logic platform 110 by issuing transactions using the peripheral interface 126. As another example, one of the virtual machines 128A-B (e.g., 128A) can be executing a management or control kernel in communication with one or more remote server computers (not shown), such as a control plane computer of a compute service that manages server computer 120. A remote server computer can be executing a virtual machine that communicates with the control kernel executing on the virtual machine 128A so that the remote virtual machine can communicate with the hardware accelerator of the configurable logic platform 110 via the control kernel executing on the virtual machine 128A.

As used herein, a transaction is a communication between components. As specific examples, a transaction can be a read request, a write, a read response, a message, an interrupt, or other various exchanges of information between components. The transaction can occur on a bus shared by multiple components. Specifically, values of signal lines of the bus can be modulated to transfer information on the bus using a communications protocol of the bus. The transaction can occur over one or more phases, such as an address phase and one or more data phases. Additionally or alternatively, the transaction can occur using one or more serial lines of a point-to-point interconnect that connects two components. Specifically, the transaction can be sent in a packet that is transmitted over the point-to-point interconnect.

The peripheral interface 126 can include a bridge for communicating between the CPU 122 using a local or front-side interconnect and components using a peripheral or expansion interconnect. Specifically, the peripheral interface 126 can be connected to a physical interconnect that is used to connect the server computer 120 to the configurable logic platform 110 and/or to other components. For example, the physical interconnect can be an expansion bus for connecting multiple components together using a shared parallel bus or serial point-to-point links. As a specific example, the physical interconnect can be PCI express, PCI, or another physical interconnect that tightly couples the server computer 120 to the configurable logic platform 110. Thus, the server computer 120 and the configurable logic platform 110 can communicate using PCI bus transactions or PCIe packets, for example.

The configurable logic platform 110 can include multiple reconfigurable logic regions 140A-B and host logic shown generally at 111. In one embodiment, the configurable logic platform 110 can include one or more integrated circuits mounted to a printed circuit board that is configured to be inserted into an expansion slot of the physical interconnect. As one example, the one or more integrated circuits can be a single FPGA and the different reconfigurable logic regions 140A-B can be different regions or areas of the FPGA. As another example, the one or more integrated circuits can be multiple FPGAs, and the different reconfigurable logic regions 140A-B can correspond to different respective FPGAs or groups of FPGAs. As a specific example, the configurable logic platform 110 can include eight FPGAs, and a particular reconfigurable logic region 140A-B can correspond to a group of one, two, or four FPGAs. As another example, the one or more integrated circuits can include an application-specific integrated circuit (ASIC) having hardwired circuits and multiple different reconfigurable logic regions 140A-B. In particular, all or a portion of the host logic can include hardwired circuits. In another embodiment, the configurable logic platform 110 can include one or more integrated circuits mounted to a motherboard of the server computer 120. In another embodiment, the configurable logic platform 110 can be integrated on a system on a chip (SOC) or multichip module that includes the CPU 122.

The host logic 111 can include a host interface 112, a management function 114, and multiple data path functions 116A-B. Each reconfigurable logic region 140A-B can include hardware that is configurable to implement a hardware accelerator or application logic. In other words, each reconfigurable logic region 140A-B can include logic that is programmable to perform a given function. For example, the reconfigurable logic regions 140A-B can include programmable logic blocks comprising combinational logic and/or look-up tables (LUTs) and sequential logic elements (such as flip-flops and/or latches), programmable routing and clocking resources, programmable distributed and block random access memories (RAMs), digital signal processing (DSP) bitslices, and programmable input/output pins. It should be noted that for ease of illustration, the alphabetic suffix is generally omitted in the following description unless the suffix can provide additional clarity (e.g., reconfigurable logic region 140A can be referred to as reconfigurable logic region 140, and so forth). It should also be noted that while two reconfigurable logic regions 140 are illustrated in FIG. 1, a different amount of reconfigurable logic regions 140 are possible (such as four, eight, or ten, for example).

The host logic can be used to encapsulate the reconfigurable logic region 140. For example, the reconfigurable logic region 140 can interface with various components of the configurable hardware platform using predefined interfaces so that the reconfigurable logic region 140 is restricted in the functionality that it can perform. As one example, the reconfigurable logic region can interface with static host logic that is loaded prior to the reconfigurable logic region 140 being configured. For example, the static host logic can include logic that isolates different components of the configurable logic platform 110 from the reconfigurable logic region 140. As one example, hard macros of the configurable logic platform 110 (such as a configuration access port or circuits for signaling on the physical interconnect) can be masked off so that the reconfigurable logic region 140 cannot directly access the hard macros. Additionally, the reconfigurable logic regions 140A-B can be masked off from each other. Thus, the reconfigurable logic region 140A cannot interface with the reconfigurable logic region 140B and vice versa.

The host logic can include the host interface 112 for communicating with the server computer 120. Specifically, the host interface 112 can be used to connect to the physical interconnect and to communicate with the server computer 120 using a communication protocol of the physical interconnect. As one example, the server computer 120 can communicate with the configurable logic platform 110 using a transaction including an address associated with the configurable logic platform 110. Similarly, the configurable logic platform 110 can communicate with the server computer 120 using a transaction including an address associated with the server computer 120. The addresses associated with the various devices connected to the physical interconnect can be predefined by a system architect and programmed into software residing on the devices. Additionally or alternatively, the communication protocol can include an enumeration sequence where the devices connected to the physical interconnect are queried and where addresses are assigned to each of devices as part of the enumeration sequence. As one example, the peripheral interface 126 can issue queries to each of the devices connected to the physical interconnect. The host interface 112 can respond to the queries by providing information about the configurable logic platform 110, such as how many functions are present on the configurable logic platform 110, and a size of an address range associated with each of the functions of the configurable logic platform 110. Based on this information, addresses of the computing system 100 can be allocated such that each function of each device connected to the physical interconnect is assigned a non-overlapping range of addresses. After enumeration, the host interface 112 can route transactions to functions of the configurable logic platform 110 based on an address of the transaction.

The host logic can include the management function 114 that can be used for managing and configuring the configurable logic platform 110. Commands and data can be sent from the server computer 120 to the management function 114 using transactions that target the address range of the management function 114. For example, the server computer 120 can generate transactions to transfer data (e.g., configuration data) and/or write control registers of the configurable logic platform 110 that are mapped to one or more addresses within the address range of the management function 114. Writing the control registers can cause the configurable logic platform 110 to perform operations, such as configuring and managing the configurable logic platform 110. As a specific example, configuration data corresponding to application logic to be implemented in the reconfigurable logic region 140 can be transmitted from the server computer 120 to the configurable logic platform 110 in one or more transactions over the physical interconnect. A transaction 150 to configure the reconfigurable logic region 140 with the configuration data can be transmitted from the server computer 120 to the configurable logic platform 110. Specifically, the transaction 150 can write a value to a control register mapped to the management function 114 address space that begins configuring the reconfigurable logic region 140. Different values and/or different control registers can be used to select between configuring the reconfigurable logic region 140A or the reconfigurable logic region 140B. In one embodiment, the configuration data can be transferred from the server computer 120 to the configurable logic platform 110 before the configuration of the reconfigurable logic region 140 begins. For example, the management function 114 can cause the configuration data to be stored in an on-chip or off-chip memory accessible by the configurable logic platform 110, and the configuration data can be read from the memory when the reconfigurable logic region 140 is being configured. In another embodiment, the configuration data can be transferred from the server computer 120 to the configurable logic platform 110 after the configuration of the reconfigurable logic region 140 begins. For example, a control register can be written to begin configuration of the reconfigurable logic region 140 and the configuration data can be streamed into or loaded onto the reconfigurable logic region 140 as transactions including the configuration data are processed by the management function 114.

The host logic can include a data path function 116 that can be used to exchange information (e.g., application input/output 160) between the server computer 120 and the configurable logic platform 110. Specifically, the data path function 116A can be used to exchange information between the server computer 120 and the reconfigurable logic region 140A and the data path function 116B can be used to exchange information between the server computer 120 and the reconfigurable logic region 140B. Commands and data can be sent from the server computer 120 to the data path function 116 using transactions that target the address range of the data path function 116. Specifically, the data path function 116A can be assigned a first range of addresses, and the data path function 116B can be assigned a second, different range of addresses. The configurable logic platform 110 can communicate with the server computer 120 using a transaction including an address associated with the server computer 120.

The data path function 116 can act as a translation layer between the host interface 112 and the reconfigurable logic region 140. Specifically, the data path function 116 can include an interface for receiving information from the reconfigurable logic region 140 and the data path function 116 can format the information for transmission from the host interface 112. Formatting the information can include generating control information for one or more transactions and partitioning data into blocks that are sized to meet protocol specifications. Thus, the data path function 116 can be interposed between the reconfigurable logic region 140 and the physical interconnect. In this manner, the reconfigurable logic region 140 can potentially be blocked from formatting transactions and directly controlling the signals used to drive the physical interconnect so that the reconfigurable logic region 140 cannot be used to inadvertently or maliciously violate protocols of the physical interconnect.

The host interface 112 can be interposed as a layer between the data path functions 116A-B and the physical interconnect. The host interface 112 can enforce bandwidth, latency, size, and other quality of service factors for transactions over the physical interconnect. For example, the host interface 112 can apportion the outgoing bandwidth for transactions originating from the data path functions 116A-B and the management function 114. As one example, the outgoing bandwidth allocated for each of the data path functions 116A-B can be specified as half of the usable bandwidth of the physical interconnect. Transactions originating from the management function 114 can be infrequent but high priority. Thus, the management function 114 can be given the highest priority for sending transactions over the physical interconnect. Alternatively, the management function 114 can be assigned a fixed amount of bandwidth to be taken from the budget of the bandwidth assigned to the data path functions 116A-B. The percentage of bandwidth assigned to each function can be fixed or programmable. For example, a control register or registers mapped to the management function 114 address space can be used to program the apportionment of the bandwidth assigned to each function. The host interface 112 can also control a maximum size transaction for transactions originating from the data path functions 116A-B and the management function 114. The physical interconnect may be more efficiently utilized when the maximum size transaction is increased since more data can potentially be transferred for a given amount of overhead or control information of the transaction (such as a packet header). However, a larger transaction size may increase latency for subsequent transactions since the later transactions cannot begin until the earlier transactions are complete. Thus, but controlling a transaction size over the physical interconnect, the latency of the transactions and/or the effective bandwidth utilization can be affected. The maximum size of transactions can be a fixed parameter of the host logic or can be programmed using a control register or registers mapped to the management function 114 address space.

In sum, applications of multiple customers running on the server computer 120 can be accelerated using the reconfigurable hardware of the configurable logic platform 110. As one example, the server computer 120 can host multiple virtual machines 128A-B, where each virtual machine is operated by a different user. The virtual machines 128A-B can run applications that can be accelerated by application logic that is loaded onto the configurable logic platform 110. Specifically, the virtual machine 128A can execute an application that can be accelerated by application logic loaded onto the reconfigurable logic region 140A. The application can communicate with the reconfigurable logic region 140A using transactions addressed to the data path function 116A. Responses from the reconfigurable logic region 140A can be returned to the application executing on the virtual machine 128A using transactions originating from the data path function 116A. The bandwidth corresponding to the transactions from the data path function 116A can be apportioned among the bandwidth corresponding to the transactions from the other functions, such as the data path function 116B. By controlling the bandwidth and/or the size of the transactions, the response of the accelerators can potentially be more deterministic and it can be more difficult for one user to determine that another user is using an accelerator of the configurable logic platform 110.

Additionally, the different virtual machines 128A-B and the application logic designs can be isolated from each other to provide the different customers with a secure and private computing environment while sharing portions of the computing infrastructure. For example, the host logic 111 and/or a hypervisor executing on the server computer 120 can restrict access to the different virtual machines 128A-B and the application logic designs so that the customers are isolated from each other. Specifically, the host logic 111 and/or the hypervisor can prevent a virtual machine (e.g., 128A) executed by one customer to access the application logic (e.g., 140B) of a different customer; the host logic 111 and/or the hypervisor can prevent a virtual machine (e.g., 128A) executed by one customer to access a virtual machine (e.g., 128B) executed by a different customer; and the host logic 111 and/or the hypervisor can prevent the application logic (e.g., 140A) of one customer from accessing a virtual machine (e.g., 128B) executed by a different customer. Additionally, the host logic 111 can prevent the application logic (e.g., 140A) of one customer from accessing the application logic (e.g., 140B) of a different customer. Thus, the system 100 can potentially provide a secure environment for the virtual machines 128A-B and the application logic designs programmed onto the reconfigurable logic regions 140A-B.

Figure 2:
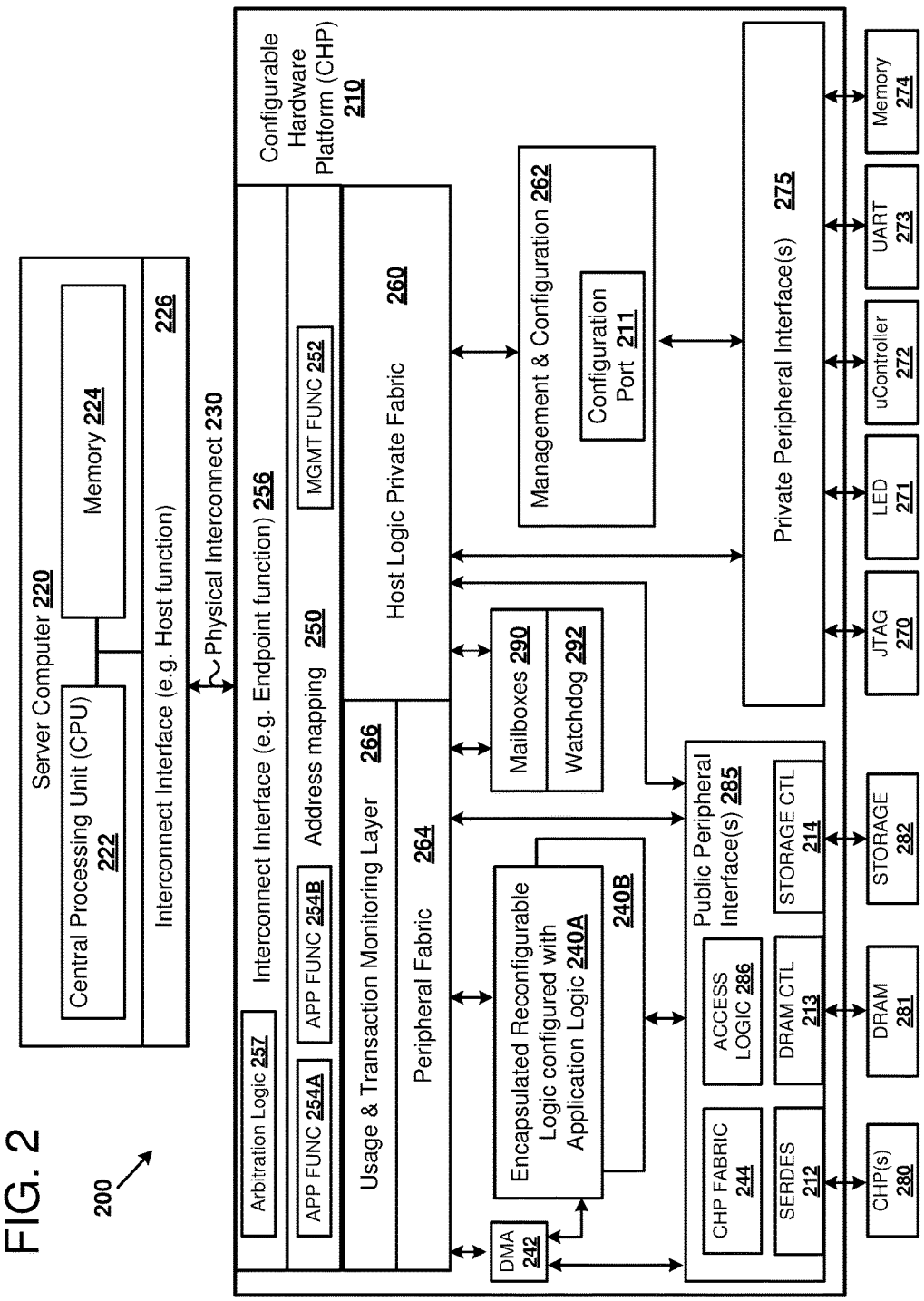
FIG. 2 is a system diagram showing another example of a system including a configurable logic platform.

FIG. 2 is a system diagram showing an example of a system 200 including a configurable hardware platform 210 and a server computer 220. The server computer 220 and the configurable hardware platform 210 can be connected via a physical interconnect 230. For example, the physical interconnect 230 can be PCI express, PCI, or any other interconnect that tightly couples the server computer 220 to the configurable hardware platform 210. The server computer 220 can include a CPU 222, memory 224, and an interconnect interface 226. For example, the interconnect interface 226 can provide bridging capability so that the server computer 220 can access devices that are external to the server computer 220. For example, the interconnect interface 226 can include a host function, such as root complex functionality as used in PCI express.

The configurable hardware platform 210 can include reconfigurable logic blocks and other hardware. The reconfigurable logic blocks can be configured or programmed to perform various functions of the configurable hardware platform 210. The reconfigurable logic blocks can be programmed multiple times with different configurations so that the blocks can perform different functions over the lifetime of the device. The functions of the configurable hardware platform 210 can be categorized based upon the purpose or capabilities of each function, or based upon when the function is loaded into the configurable hardware platform 210. For example, the configurable hardware platform 210 can include static logic, reconfigurable logic, and hard macros. The functionality for the static logic, reconfigurable logic, and hard macros can be configured at different times.

Thus, the functionality of the configurable hardware platform 210 can be loaded incrementally.

A hard macro can perform a predefined function and can be available when the configurable hardware platform 210 is powered on. For example, a hard macro can include hard-wired circuits that perform a specific function. As specific examples, the hard macros can include a configuration port 211 for configuring the configurable hardware platform 210, a serializer-deserializer transceiver (SERDES) 212 for communicating serial data, a memory or dynamic random access memory (DRAM) controller 213 for signaling and controlling off-chip memory (such as a double data rate (DDR) DRAM 281), and a storage controller 214 for signaling and controlling a storage device 282.

The static logic can be loaded at boot time onto reconfigurable logic blocks. For example, configuration data specifying the functionality of the static logic can be loaded from an on-chip or off-chip flash memory device during a boot-up sequence. The boot-up sequence can include detecting a power event (such as by detecting that a supply voltage has transitioned from below a threshold value to above the threshold value) and deasserting a reset signal in response to the power event. An initialization sequence can be triggered in response to the power event or the reset being deasserted. The initialization sequence can include reading configuration data stored on the flash device and loading the configuration data onto the configurable hardware platform 210 using the configuration port 211 so that at least a portion of the reconfigurable logic blocks are programmed with the functionality of the static logic. After the static logic is loaded, the configurable hardware platform 210 can transition from a loading state to an operational state that includes the functionality of the static logic.

The reconfigurable logic can be loaded onto reconfigurable logic blocks while the configurable hardware platform 210 is operational (e.g., after the static logic has been loaded). The configuration data corresponding to the reconfigurable logic can be stored in an on-chip or off-chip memory and/or the configuration data can be received or streamed from an interface (e.g., the interconnect interface 256) of the configurable hardware platform 210. The reconfigurable logic can be divided into non-overlapping regions, which can interface with static logic. For example, the reconfigurable regions can be arranged in an array or other regular or semi-regular structure. For example, the array structure may include holes or blockages where hard macros are placed within the array structure. The different reconfigurable regions are capable of communicating with each other, the static logic, and the hard macros by using programmable signal lines that can be specified as static logic. The different reconfigurable regions can be configured at different points in time so that a first reconfigurable region can be configured at a first point in time and a second reconfigurable region can be configured at a second point in time.

The functions of the configurable hardware platform 210 can be divided or categorized based upon the purpose or capabilities of the functions. For example, the functions can be categorized as control plane functions, data plane functions, and shared functions. A control plane can be used for management and configuration of the configurable hardware platform 210. The data plane can be used to manage data transfer between accelerator logic loaded onto the configurable hardware platform 210 and the server computer 220. Shared functions can be used by both the control plane and the data plane. The control plane functionality can be loaded onto the configurable hardware platform 210 prior to loading the data plane functionality. The control plane can include host logic of the configurable hardware platform 210. The data plane can include multiple areas of encapsulated reconfigurable logic configured with application logic 240A-B. It should be noted that while the different areas of encapsulated reconfigurable logic 240A-B are shown as overlapping in the illustration of FIG. 2, the physical location of the different areas 240A-B are generally placed in non-overlapping regions of one or more integrated circuits. Also, while only two different areas of encapsulated reconfigurable logic 240A-B are shown, more areas are possible.

Generally, the control plane and the different regions of the data plane can be accessed using different functions of the configurable hardware platform 210, where the different functions are assigned to different address ranges. Specifically, the control plane functions can be accessed using a management function 252 and the data plane functions can be accessed using data path functions or application functions 254A-B. An address mapping layer 250 can differentiate transactions bound for the control plane or the different functions of the data plane. In particular, transactions from the server computer 220 bound for the configurable hardware platform 210 can be identified using an address within the transaction. Specifically, if the address of the transaction falls within the range of addresses assigned to the configurable hardware platform 210, the transaction is destined for the configurable hardware platform 210. The range of addresses assigned to the configurable hardware platform 210 can span the range of addresses assigned to each of the different functions. The transaction can be sent over the physical interconnect 230 and received at the interconnect interface 256. The interconnect interface 256 can be an endpoint of the physical interconnect 230. It should be understood that the physical interconnect 230 can include additional devices (e.g., switches and bridges) arranged in a fabric for connecting devices or components to the server computer 220.

The address mapping layer 250 can analyze the address of the transaction and determine where to route the transaction within the configurable hardware platform 210 based on the address. For example, the management function 252 can be assigned a first range of addresses and different functions of the management plane can be accessed by using different addresses within that range. Transactions with addresses falling within the range assigned to the management function 252 can be routed through the host logic private fabric 260 to the different blocks of the control plane. For example, transactions can be addressed to a management and configuration block 262. Similarly, the application function 254A can be assigned a second range of addresses, the application function 254B can be assigned a third range of addresses, and different functions of the data plane can be accessed by using different addresses within those ranges.

The management and configuration block 262 can include functions related to managing and configuring the configurable hardware platform 210. For example, the management and configuration block 262 can provide access to the configuration port 211 so that the reconfigurable logic blocks can be configured. For example, the server computer 220 can send a transaction to the management and configuration block 262 to initiate loading of the application logic within the encapsulated reconfigurable logic 240A or 240B. The configuration data corresponding to the application logic can be sent from the server computer 220 to the management function 252. The management function 252 can route the configuration data corresponding to the application logic through the host logic fabric 260 to the configuration port 211 so that the application logic can be loaded.

As another example, the management and configuration block 262 can store metadata about the configurable hardware platform 210. For example, versions of the different logic blocks, update histories, and other information can be stored in memory of the management and configuration block 262. The server computer 220 can read the memory to retrieve some or all of the metadata. Specifically, the server computer 220 can send a read request targeting the memory of the management and configuration block 262 and the management and configuration block 262 can generate read response data to return to the server computer 220.

The management function 252 can also be used to access private peripherals of the configurable hardware platform 210. The private peripherals are components that are only accessible from the control plane. For example, the private peripherals can include a JTAG (e.g., IEEE 1149.1) controller 270, light emitting displays (LEDs) 271, a microcontroller 272, a universal asynchronous receiver/transmitter (UART) 273, a memory 274 (e.g., a serial peripheral interface (SPI) flash memory), and any other components that are accessible from the control plane and not the data plane. The management function 252 can access the private peripherals by routing commands through the host logic private fabric 260 and the private peripheral interface(s) 275. The private peripheral interface(s) 275 can directly communicate with the private peripherals.

Public peripherals are shared functions that are accessible from either the control plane or the data plane. For example, the public peripherals can be accessed from the control plane by addressing transactions within the address range assigned to the management function 252. The public peripherals can be accessed from the data plane by addressing transactions within the address range assigned to the application function 254. Thus, the public peripherals are components that can have multiple address mappings and can be used by both the control plane and the data plane. Examples of the public peripherals are other configurable hardware platform(s) (CHP(s)) 280, DRAM 281 (e.g., DDR DRAM), storage devices 282 (e.g., hard disk drives and solid-state drives), and other various components that can be used to generate, store, or process information. The public peripherals can be accessed via the public peripheral interfaces 285. Thus, the public peripheral interfaces 285 can be an intermediary layer interposed between the public peripherals and the other functions of the configurable hardware platform 210. Specifically, the public peripheral interfaces 285 can translate requests from the control plane or the data plane and format communications to the public peripherals into a native protocol of the public peripherals.

Additionally, the public peripheral interfaces 285 can be used to control access to and/or isolate all or portions of the public peripherals. As one example, the access logic 286 can enforce bandwidth, latency, size, and other quality of service factors for transactions to and from the public peripherals. For example, the access logic 286 can arbitrate between requests from the different functions targeted to the public peripherals. The access logic 286 can enforce a fair distribution of access so that requests originating at one reconfigurable logic area cannot starve out requests originating at another reconfigurable logic area or the from the management function 252. As a specific example, the access logic 286 can enforce a round-robin distribution of access for each of the components accessing the public peripherals. In one embodiment, the access logic 286 can give the management function 252 highest priority to the peripherals. Additionally, the access logic 286 can enforce a size limitation on transfers between the public peripherals and the different components. By enforcing the size limitation, the latency to access a public peripheral can potentially be more deterministic. Additionally, the access logic 286 can enforce a bandwidth apportionment of the public peripherals. For example, some of the components may transfer small amounts of data (e.g., a byte or a word) to and from the peripherals and other components may transfer larger amounts of data (e.g., sixteen or thirty-two words) to and from the peripherals in a given request. A pure round-robin approach may penalize the component using smaller transfer sizes, so a bandwidth-aware scheduling algorithm can potentially apportion the bandwidth more accurately. The access logic 286 can evenly apportion the available bandwidth to the peripherals or the bandwidth apportionment can be programmable. For example, a control register or registers mapped to the management function 114 address space can be used to program the apportionment of the bandwidth assigned to each component accessing the peripherals. As one specific example, the access logic 286 can be programmed to apportion the bandwidth so that the reconfigurable logic region 240A receives 75% of the bandwidth and the reconfigurable logic region 240B receives 25% of the bandwidth.

The access logic 286 can also enforce a mapping of the peripheral address space to different components of the configurable hardware platform 210. For example, the address space of the peripherals can be dedicated to a single component or shared among the components. As a specific example, the address space of the DRAM 281 can be divided into two separate non-overlapping address spaces where the reconfigurable logic region 240A can be assigned to a first range of addresses and the reconfigurable logic region 240B can be assigned to a second range of addresses. Thus, the DRAM storage locations assigned to the different reconfigurable logic regions can be isolated from each other to maintain privacy of the users. As another specific example, the address space of the DRAM 281 can be divided into two separate non-overlapping address spaces dedicated to each of the reconfigurable logic regions 240A-B and an additional address space that can be shared by the reconfigurable logic regions 240A-B. Thus, there can be private areas of the DRAM 281 and shared areas of the DRAM 281. By allowing shared memory space of the public peripherals, one accelerator can potentially share data with another accelerator faster than compared to transferring all data between accelerators over the physical interconnect 230. The mapping of the peripheral address space can be fixed by the host logic or can be programmed using a control register or registers mapped to the management function 114 address space.

Mailboxes 290 and watchdog timers 292 are shared functions that are accessible from either the control plane or the data plane. Specifically, the mailboxes 290 can be used to pass messages and other information between the control plane and the data plane. In one embodiment, the mailboxes 290 can be used to pass messages and other information between the different application functions 254A-B of the data plane. The mailboxes 290 can include buffers, control registers (such as semaphores), and status registers. By using the mailboxes 290 as an intermediary between the different functions of the data plane and the control plane, isolation between the different functions of the data plane and the control plane can potentially be increased which can increase the security of the configurable hardware platform 210.

The watchdog timers 292 can be used to detect and recover from hardware and/or software malfunctions. For example, a watchdog timer 292 can monitor an amount of time taken to perform a particular task, and if the amount of time exceeds a threshold, the watchdog timer 292 can initiate an event, such as writing a value to a control register or causing an interrupt or reset to be asserted. As one example, the watchdog timer 292 can be initialized with a first value when beginning a first task. The watchdog timer 292 can automatically count down after it is initialized and if the watchdog timer 292 reaches a zero value, an event can be generated. Alternatively, if the first task finishes before the watchdog timer 292 reaches a zero value, the watchdog timer 292 can be reinitialized with a second value when beginning a second task. The first and second values can be selected based on a complexity or an amount of work to complete in the first and second tasks, respectively.

The application functions 254A-B can be used to access the data plane functions, such as the application logic 240A-B. As one example, the application function 254A can be used to access the application logic 240A and the application function 254B can be used to access the application logic 240B. For example, a transaction directed to one of the application logic designs 240A-B can cause data to be loaded, processed, and/or returned to the server computer 220. Specifically, the data plane functions can be accessed using transactions having an address within the range assigned to one of the application functions 254A-B. For example, a transaction can be sent from the server computer 220 to the application logic 240A via the application function 254A. Specifically, transactions addressed to the application function 254A can be routed through the peripheral fabric 264 to the application logic 240A. Responses from the application logic 240A can be routed through the peripheral fabric 264 to the application function 254A, through the interconnect interface 256, and then back to the server computer 220. Additionally, the data and transactions generated by the application logic 240A-B can be monitored using a usage and transaction monitoring layer 266. The monitoring layer 266 can potentially identify transactions or data that violate predefined rules and can generate an alert to be sent over the control plane. Additionally or alternatively, the monitoring layer 266 can terminate any transactions generated by the application logic 240A-B that violate any criteria of the monitoring layer 266. Additionally, the monitoring layer 266 can analyze information moving to or from the application logic 240A-B so that statistics about the information can be collected and accessed from the control plane.

The interconnect interface 256 can include arbitration logic 257 for apportioning bandwidth of the application functions 254A-B across the physical interconnect 230. Specifically, the arbitration logic 257 can select which transactions from a queue or list of transactions originating from the application functions 254A-B are to be sent. As one example, the arbitration logic 257 can select an order of the transactions so that the bandwidth associated with each application function 254A-B matches a predefined or programmed division of the available bandwidth of the physical interconnect 230. Specifically, the arbitration logic 257 can track a history of the amount of data transferred by each application function 254A-B over the physical interconnect 230, and the next transaction can be selected to maintain a specified apportionment of the bandwidth among the different application functions 254A-B. As another example, the arbitration logic 257 can assign time-slots to each application function 254A-B, and transactions from a given application function can only be sent during the time-slot for the respective application function. Thus, transactions from the application function 254A can only be sent during the time-slot assigned to the application function 254A, transactions from the application function 254B can only be sent during the time-slot assigned to the application function 254B, and so forth.

Data can also be transferred between the server computer 220 and the application logic by programming a direct memory access (DMA) engine 242. The DMA engine 242 can include control and status registers for programming or specifying DMA transfers from a source location to a destination location. As one example, the DMA engine 242 can be programmed to pull information stored within the memory 224 of server computer 220 into the application logic 240 or into the public peripherals of the configurable hardware platform 210. As another example, the DMA engine 242 can be programmed to push data that has been generated by the application logic 240 to the memory 224 of the server computer 220. The data generated by the application logic 240 can be streamed from the application logic 240 or can be written to the public peripherals, such as the memory 281 or storage 282.

The application logic 240A-B can communicate with other configurable hardware platforms 280. For example, the other configurable hardware platforms 280 can be connected by one or more serial lines that are in communication with the SERDES 212. The application logic 240A-B can generate transactions to the different configurable hardware platforms 280, and the transactions can be routed through the CHP fabric 244 to the corresponding serial lines (via the SERDES 212) of the configurable hardware platforms 280. Similarly, the application logic 240A-B can receive information from other configurable hardware platforms 280 using the reverse path. The CHP fabric 244 can be programmed to provide different access privileges to the application logic of different reconfigurable regions 240A-B. In this manner, the application logic of different reconfigurable regions 240A-B can communicate with different CHPs. As a specific example, the reconfigurable region 240A can communicate with a first set of CHPs and the reconfigurable region 240B can communicate with a second set of CHPs that is mutually exclusive with the first set of CHPs. As another example, there can be shared CHPs and private CHPs for the different reconfigurable regions 240A-B. The CHP fabric 244 can be used to apportion the bandwidth and/or transfer size for CHPs that are shared among the different reconfigurable regions 240A-B.

In sum, the functions of the configurable hardware platform 210 can be categorized as control plane functions and data plane or application functions. The control plane functions can be used to monitor and restrict the capabilities of the data plane. The data plane functions can be used to accelerate a user's application that is running on the server computer 220. By separating the functions of the control and data planes, the security and availability of the server computer 220 and other computing infrastructure can potentially be increased. For example, the application logic 240 cannot directly signal onto the physical interconnect 230 because the intermediary layers of the control plane control the formatting and signaling of transactions of the physical interconnect 230. As another example, the application logic 240 can be prevented from using the private peripherals which could be used to reconfigure the configurable hardware platform 210 and/or to access management information that may be privileged. As another example, the application logic 240 can only access hard macros of the configurable hardware platform 210 through intermediary layers so that any interaction between the application logic 240 and the hard macros is controlled using the intermediary layers.

Figure 3:
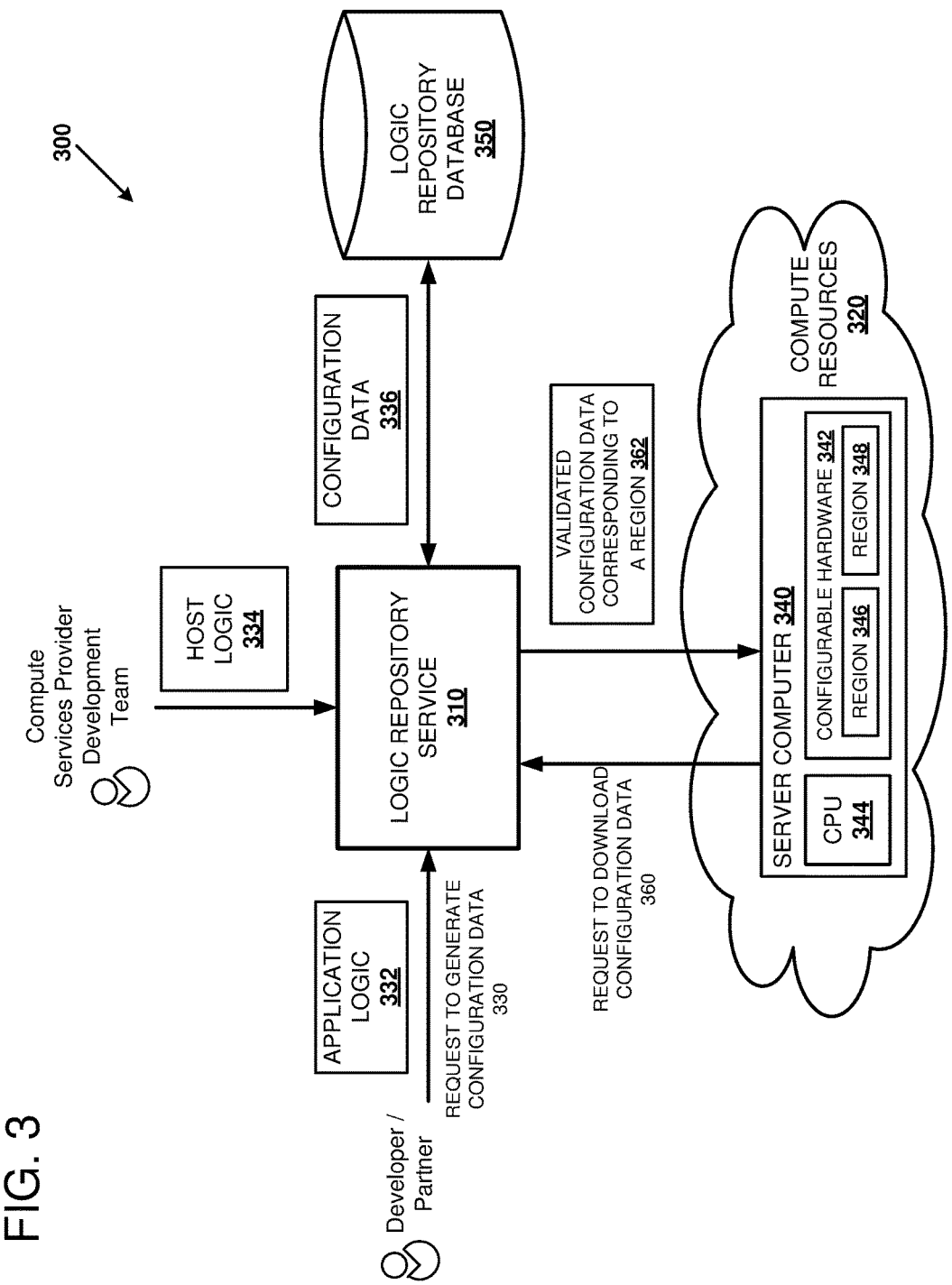
FIG. 3 is a system diagram showing an example of a system including a logic repository service for supplying configuration data to a configurable logic platform.

FIG. 3 is a system diagram showing an example of a system 300 including a logic repository service 310 for managing configuration data that can be used to configure configurable resources within a fleet of compute resources 320. A compute services provider can maintain the fleet of computing resources 320 for users of the services to deploy when a computing task is to be performed. The computing resources 320 can include server computers 340 having configurable logic resources 342 that can be programmed as hardware accelerators. The compute services provider can manage the computing resources 320 using software services to manage the configuration and operation of the configurable hardware 342. As one example, the compute service provider can execute a logic repository service 310 for ingesting application logic 332 specified by a user, generating configuration data 336 for configuring the configurable logic platform based on the logic design of the user, and downloading the validated configuration data 362 in response to a request 360 to configure an instance of the configurable logic platform. The download request 360 can be from the user that developed the application logic 332 or from a user that has acquired a license to use the application logic 332. Thus, the application logic 332 can be created by the compute services provider, a user, or a third-party separate from the user or the compute services provider. For example, a marketplace of accelerator intellectual property (IP) can be provided to the users of the compute services provider, and the users can potentially increase the speed of their applications by selecting an accelerator from the marketplace.

The logic repository service 310 can be a network-accessible service, such as a web service. Web services are commonly used in cloud computing. A web service is a software function provided at a network address over the web or the cloud. Clients initiate web service requests to servers and servers process the requests and return appropriate responses. The client web service requests are typically initiated using, for example, an API request. For purposes of simplicity, web service requests are generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request. Additionally or alternatively, the web service can perform actions in response to the API request without generating a response to the endpoint identified in the request.

The logic repository service 310 can receive an API request 330 to generate configuration data for a configurable hardware platform, such as the configurable hardware 342 of the server computer 340. For example, the API request 330 can be originated by a developer or partner user of the compute services provider. The request 330 can include fields for specifying data and/or metadata about the logic design, the configurable hardware platform, user information, access privileges, production status, and various additional fields for describing information about the inputs, outputs, and users of the logic repository service 310. As specific examples, the request can include a description of the design, a production status (such as trial or production), an encrypted status of the input or output of the service, a reference to a location for storing an input file (such as the hardware design source code), a type of the input file, an instance type of the configurable hardware, and a reference to a location for storing an output file or report. In particular, the request can include a reference to a hardware design specifying application logic 332 for implementation on the configurable hardware platform. Specifically, a specification of the application logic 332 and/or of the host logic 334 can be a collection of files, such as source code written in a hardware description language (HDL), a netlist generated by a logic synthesis tool, and/or placed and routed logic gates generated by a place and route tool.

The compute resources 320 can include many different types of hardware and software categorized by instance type. In particular, an instance type specifies at least a portion of the hardware and software of a resource. For example, hardware resources can include servers with central processing units (CPUs) of varying performance levels (e.g., different clock speeds, architectures, cache sizes, and so forth), servers with and without co-processors (such as graphics processing units (GPUs) and configurable logic), servers with varying capacity and performance of memory and/or local storage, and servers with different networking performance levels. Example software resources can include different operating systems, application programs, and drivers. One example instance type can comprise the server computer 340 including a central processing unit (CPU) 344 in communication with the configurable hardware 342. The configurable hardware 342 can include programmable logic such as an FPGA, a programmable logic array (PLA), a programmable array logic (PAL), a generic array logic (GAL), or a complex programmable logic device (CPLD), for example. As specific examples, an "F1.small" instance type can include a first type of server computer with one capacity unit of FPGA resources, an "F1.medium" instance type can include the first type of server computer with two capacity units of FPGA resources, an "F1.large" instance type can include the first type of server computer with eight capacity units of FPGA resources, and an "F2.large" instance type can include a second type of server computer with eight capacity units of FPGA resources. The configurable hardware 342 can include multiple regions of programmable logic, such as the regions 346 and 348.

The logic repository service 310 can generate configuration data 336 in response to receiving the API request 330. The generated configuration data 336 can be based on the application logic 332 and the host logic 334. Specifically, the generated configuration data 336 can include information that can be used to program or configure the configurable hardware 342 so that it performs the functions specified by the application logic 332 and the host logic 334. As one example, the compute services provider can generate the host logic 334 including logic for interfacing between the CPU 344 and the configurable hardware 342. Specifically, the host logic 334 can include logic for masking or shielding the application logic 332 from communicating directly with the CPU 344 so that all CPU-application logic transactions pass through the host logic 334. In this manner, the host logic 334 can potentially reduce security and availability risks that could be introduced by the application logic 332.

Generating the configuration data 336 can include performing checks and/or tests on the application logic 332, integrating the application logic 332 into a host logic 334 wrapper, synthesizing the application logic 332, and/or placing and routing the application logic 332. Checking the application logic 332 can include verifying the application logic 332 complies with one or more criteria of the compute services provider. For example, the application logic 332 can be analyzed to determine whether interface signals and/or logic functions are present for interfacing to the host logic 334. In particular, the analysis can include analyzing source code and/or running the application logic 332 against a suite of verification tests. The verification tests can be used to confirm that the application logic is compatible with the host logic. As another example, the application logic 332 can be analyzed to determine whether the application logic 332 fits within a designated region (e.g., region 346 or 348) of the specified instance type. As another example, the application logic 332 can be analyzed to determine whether the application logic 332 includes any prohibited logic functions, such as ring oscillators or other potentially harmful circuits. As another example, the application logic 332 can be analyzed to determine whether the application logic 332 has any naming conflicts with the host logic 334 or any extraneous outputs that do not interface with the host logic 334. As another example, the application logic 332 can be analyzed to determine whether the application logic 332 attempts to interface to restricted inputs, outputs, or hard macros of the configurable hardware 342. If the application logic 332 passes the checks of the logic repository service 310, then the configuration data 336 can be generated. If any of the checks or tests fail, the generation of the configuration data 336 can be aborted.

Generating the configuration data 336 can include compiling and/or translating source code of the application logic 332 and the host logic 334 into data that can be used to program or configure the configurable hardware 342. For example, the logic repository service 310 can integrate the application logic 332 into a host logic 334 wrapper. Specifically, the application logic 332 can be instantiated into one or more system designs that include the application logic 332 and the host logic 334. For example, a first system design can instantiate the application logic 332 in a host logic wrapper corresponding to the region 346 and a second system design can instantiate the application logic 332 in a host logic wrapper corresponding to the region 348. Each of the integrated system designs can synthesized, using a logic synthesis program, to create one or more netlists for the system designs. Each netlist can be placed and routed, using a place and route program, for the instance type specified for the system design. Each placed and routed design can be converted to configuration data 336 which can be used to program the configurable hardware 342. For example, the configuration data 336 can be directly output from the place and route program. Thus, the generated configuration data can include data that can be used to program the configurable hardware 342 with application logic 332 that is placed in one or more regions, such as the regions 346 and 348.

As one example, the generated configuration data 336 can include a complete or partial bitstream for configuring all or a portion of the configurable logic of an FPGA. An FPGA can include configurable logic and non-configurable logic. The configurable logic can include programmable logic blocks comprising combinational logic and/or look-up tables (LUTs) and sequential logic elements (such as flip-flops and/or latches), programmable routing and clocking resources, programmable distributed and block random access memories (RAMs), digital signal processing (DSP) bitslices, and programmable input/output pins. The bitstream can be loaded into on-chip memories of the configurable logic using configuration logic (e.g., a configuration access port). The values loaded within the on-chip memories can be used to control the configurable logic so that the configurable logic performs the logic functions that are specified by the bitstream. Additionally, the configurable logic can be divided into different regions (such as the regions 346 and 348) which can be configured independently of one another. As one example, a full bitstream can be used to configure the configurable logic across all of the regions and a partial bitstream can be used to configure only a portion of the configurable logic regions. As specific examples, a first partial bitstream can be used to configure the region 346 with the application logic 332, a second partial bitstream can be used to configure the region 348 with the application logic 332, and a third partial bitstream can be used to configure one or more regions outside of the regions 346 and 348 with the host logic 334. The non-configurable logic can include hard macros that perform a specific function within the FPGA, such as input/output blocks (e.g., serializer and deserializer (SERDES) blocks and gigabit transceivers), analog-to-digital converters, memory control blocks, test access ports, and configuration logic for loading the configuration data onto the configurable logic.

The logic repository service 310 can store the generated configuration data 336 in a logic repository database 350. The logic repository database 350 can be stored on removable or non-removable media, including magnetic disks, direct-attached storage, network-attached storage (NAS), storage area networks (SAN), redundant arrays of independent disks (RAID), magnetic tapes or cassettes, CD-ROMs, DVDs, or any other medium which can be used to store information in a non-transitory way and which can be accessed by the logic repository service 310. Additionally, the logic repository service 310 can be used to store input files (such as the specifications for the application logic 332 and the host logic 334) and metadata about the logic designs and/or the users of the logic repository service 310. The generated configuration data 336 can be indexed by one or more properties such as a user identifier, an instance type or types, a region of an instance type, a marketplace identifier, a machine image identifier, and a configurable hardware identifier, for example.

The logic repository service 310 can receive an API request 360 to download configuration data. For example, the request 360 can be generated when a user of the compute resources 320 launches or deploys a new instance (e.g., an F1 instance) within the compute resources 320. As another example, the request 360 can be generated in response to a request from an application executing on an operating instance. The request 360 can include a reference to the source and/or destination instance, a reference to the configuration data to download (e.g., an instance type, a region of an instance type, a marketplace identifier, a machine image identifier, or a configurable hardware identifier), a user identifier, an authorization token, and/or other information for identifying the configuration data to download and/or authorizing access to the configuration data. If the user requesting the configuration data is authorized to access the configuration data, the configuration data can be retrieved from the logic repository database 350, and validated configuration data 362 (e.g. a full or partial bitstream)

corresponding to one or more configurable regions can be downloaded to the requesting instance (e.g., server computer 340). The validated configuration data 362 can be used to configure one or more regions of the configurable logic of the destination instance. For example, the validated configuration data 362 can be used to configure only the region 346 or only the region 348 of the configurable hardware 342.

The logic repository service 310 can verify that the validated configuration data 362 can be downloaded to the requesting instance. Validation can occur at multiple different points by the logic repository service 310. For example, validation can include verifying that the application logic 332 is compatible with the host logic 334. In particular, a regression suite of tests can be executed on a simulator to verify that the host logic 334 performs as expected after the application logic 332 is added to the design. Additionally or alternatively, it can be verified that the application logic 332 is specified to reside only in reconfigurable regions that are separate from reconfigurable regions of the host logic 334. As another example, validation can include verifying that the validated configuration data 362 is compatible with the instance type to download to. As another example, validation can include verifying that the requestor is authorized to access the validated configuration data 362. If any of the validation checks fail, the logic repository service 310 can deny the request to download the validated configuration data 362. Thus, the logic repository service 310 can potentially safeguard the security and the availability of the computing resources 320 while enabling a user to customize hardware of the computing resources 320.

Figure 4:
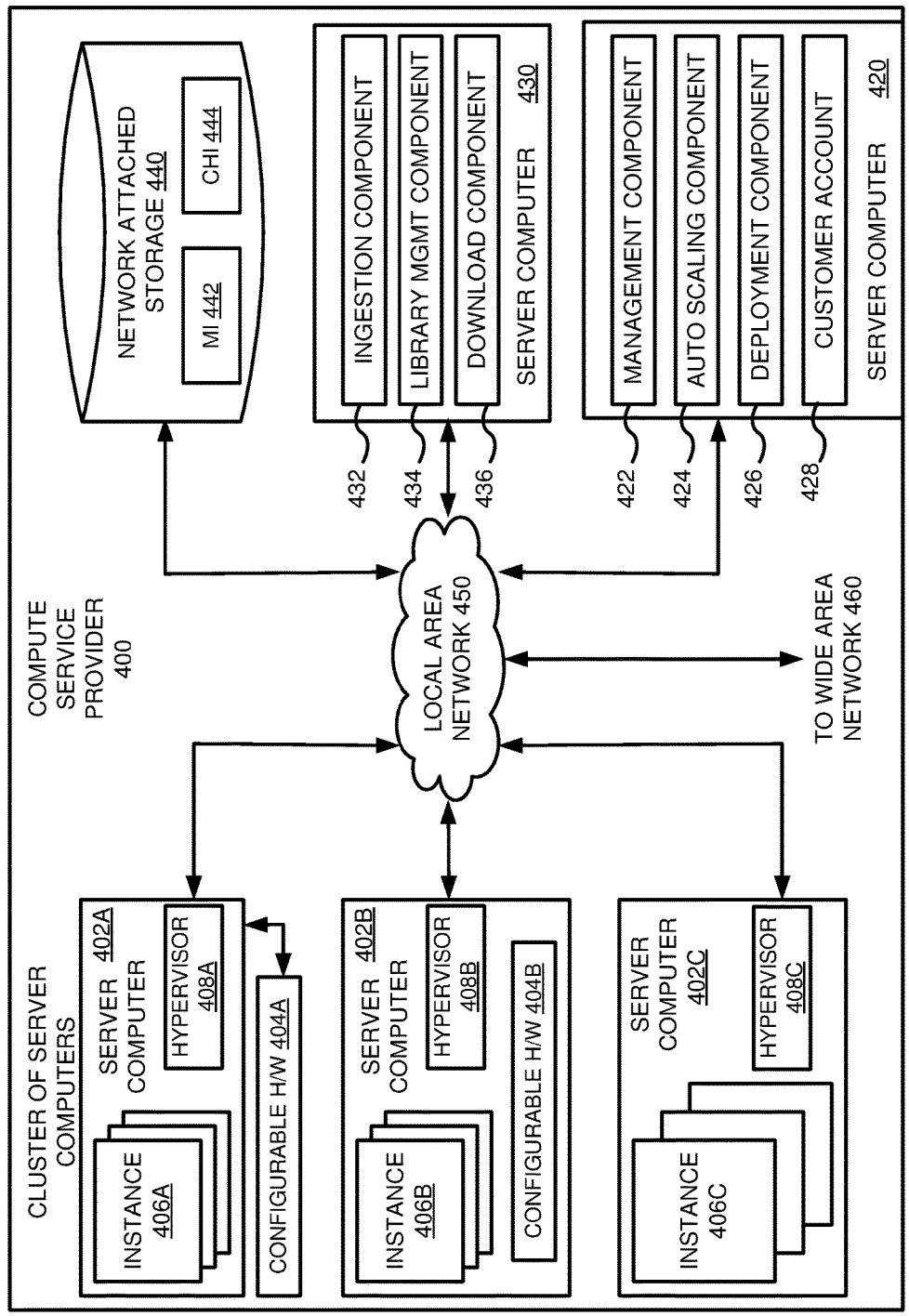
FIG. 4 is an example system diagram showing a plurality of virtual machine instances running in a multi-tenant environment including server computers having a configurable logic platform.

FIG. 4 is a computing system diagram of a network-based compute service provider 400 that illustrates one environment in which embodiments described herein can be used. By way of background, the compute service provider 400 (i.e., the cloud provider) is capable of delivery of computing and storage capacity as a service to a community of end recipients. In an example embodiment, the compute service provider can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. Additionally, application developers can develop and run their hardware solutions on configurable hardware of the compute service provider platform. The SaaS model allows installation and operation of application software in the compute service provider. In some embodiments, end users access the compute service provider 400 using networked client devices, such as desktop computers, laptops, tablets, smartphones, etc. running web browsers or other lightweight client applications. Those skilled in the art will recognize that the compute service provider 400 can be described as a "cloud" environment.

The particular illustrated compute service provider 400 includes a plurality of server computers 402A-402C. While only three server computers are shown, any number can be used, and large centers can include thousands of server computers. The server computers 402A-402C can provide computing resources for executing software instances 406A-406C. In one embodiment, the software instances 406A-406C are virtual machines. As known in the art, a virtual machine is an instance of a software implementation of a machine (i.e. a computer) that executes applications like a physical machine. In the example of a virtual machine, each of the servers 402A-402C can be configured to execute a hypervisor 408 or another type of program configured to enable the execution of multiple software instances 406 on a single server. Additionally, each of the software instances 406 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

The server computers 402A-402C can include a heterogeneous collection of different hardware resources or instance types. Some of the hardware instance types can include configurable hardware that is at least partially configurable by a user of the compute service provider 400. One example of an instance type can include the server computer 402A which is in communication with configurable hardware 404A. Specifically, the server computer 402A and the configurable hardware 404A can communicate over a local interconnect such as PCIe. Another example of an instance type can include the server computer 402B and configurable hardware 404B. For example, the configurable logic 404B can be integrated within a multi-chip module or on the same die as a CPU of the server computer 402B. Yet another example of an instance type can include the server computer 402C without any configurable hardware. Thus, hardware instance types with and without configurable logic can be present within the resources of the compute service provider 400.

One or more server computers 420 can be reserved for executing software components for managing the operation of the server computers 402 and the software instances 406. For example, the server computer 420 can execute a management component 422. A customer can access the management component 422 to configure various aspects of the operation of the software instances 406 purchased by the customer. For example, the customer can purchase, rent or lease instances and make changes to the configuration of the software instances. The configuration information for each of the software instances can be stored as a machine image (MI) 442 on the network-attached storage 440. Specifically, the MI 442 describes the information used to launch a VM instance. The MI can include a template for a root volume of the instance (e.g., an OS and applications), launch permissions for controlling which customer accounts can use the MI, and a block device mapping which specifies volumes to attach to the instance when the instance is launched. The MI can also include a reference to a configurable hardware image (CHI) 442 which is to be loaded on configurable hardware 404 when the instance is launched. The CHI includes configuration data for programming or configuring at least a portion of the configurable hardware 404.

The customer can also specify settings regarding how the purchased instances are to be scaled in response to demand. The management component can further include a policy document to implement customer policies. An auto scaling component 424 can scale the instances 406 based upon rules defined by the customer. In one embodiment, the auto scaling component 424 allows a customer to specify scale-up rules for use in determining when new instances should be instantiated and scale-down rules for use in determining when existing instances should be terminated. The auto scaling component 424 can consist of a number of subcomponents executing on different server computers 402 or other computing devices. The auto scaling component 424 can monitor available computing resources over an internal management network and modify resources available based on need.

A deployment component 426 can be used to assist customers in the deployment of new instances 406 of computing resources. The deployment component can have access to account information associated with the instances, such as who is the owner of the account, credit card information, country of the owner, etc. The deployment component 426 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 426 can utilize the customer-provided configuration and cache logic to configure, prime, and launch new instances 406. The configuration, cache logic, and other information may be specified by a customer using the management component 422 or by providing this information directly to the deployment component 426. The instance manager can be considered part of the deployment component.

Customer account information 428 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, a listing of the MI's and CHI's accessible to the customer, etc.

One or more server computers 430 can be reserved for executing software components for managing the download of configuration data to configurable hardware 404 of the server computers 402. For example, the server computer 430 can execute a logic repository service comprising an ingestion component 432, a library management component 434, and a download component 436. The ingestion component 432 can receive host logic and application logic designs or specifications and generate configuration data that can be used to configure the configurable hardware 404. The library management component 434 can be used to manage source code, user information, and configuration data associated with the logic repository service. For example, the library management component 434 can be used to store configuration data generated from a user's design in a location specified by the user on the network-attached storage 440. In particular, the configuration data can be stored within a configurable hardware image 442 on the network-attached storage 440. Additionally, the library management component 434 can manage the versioning and storage of input files (such as the specifications for the application logic and the host logic) and metadata about the logic designs and/or the users of the logic repository service. The library management component 434 can index the generated configuration data by one or more properties such as a user identifier, an instance type, a marketplace identifier, a machine image identifier, and a configurable hardware identifier, for example. The download component 436 can be used to authenticate requests for configuration data and to transmit the configuration data to the requestor when the request is authenticated. For example, agents on the server computers 402A-B can send requests to the download component 436 when the instances 406 are launched that use the configurable hardware 404. As another example, the agents on the server computers 402A-B can send requests to the download component 436 when the instances 406 request that the configurable hardware 404 be partially reconfigured while the configurable hardware 404 is in operation.

The network-attached storage (NAS) 440 can be used to provide storage space and access to files stored on the NAS 440. For example, the NAS 440 can include one or more server computers used for processing requests using a network file sharing protocol, such as Network File System (NFS). The NAS 440 can include removable or non-removable media, including magnetic disks, storage area networks (SANs), redundant arrays of independent disks (RAID), magnetic tapes or cassettes, CD-ROMs, DVDs, or any other medium which can be used to store information in a non-transitory way and which can be accessed over the network 450.

The network 450 can be utilized to interconnect the server computers 402A-402C, the server computers 420 and 430, and the storage 440. The network 450 can be a local area network (LAN) and can be connected to a Wide Area Network (WAN) 460 so that end users can access the compute service provider 400. It should be appreciated that the network topology illustrated in FIG. 4 has been simplified and that many more networks and networking devices can be utilized to interconnect the various computing systems disclosed herein.

Figure 5:
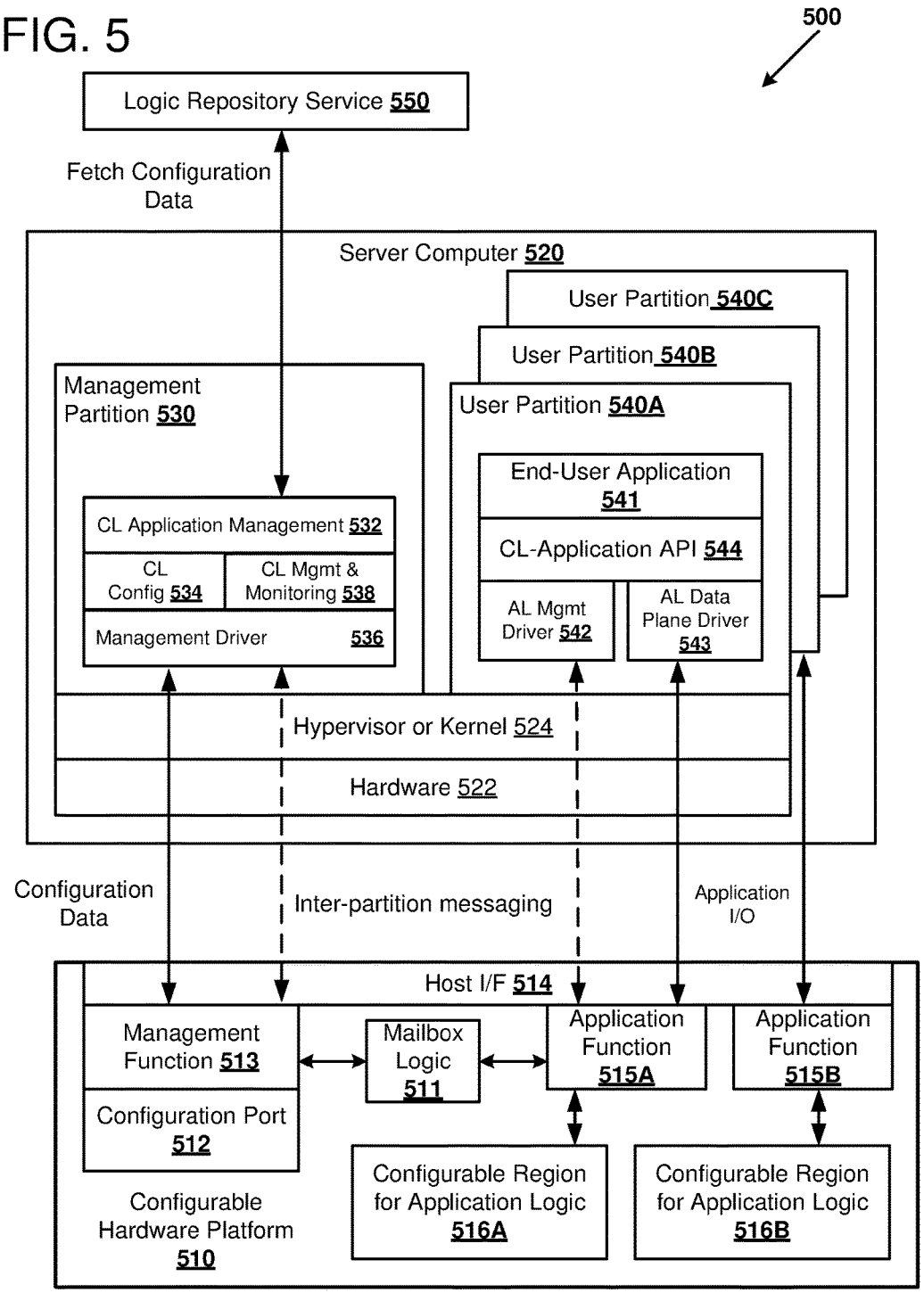
FIG. 5 shows further details of the example system of FIG. 4 including components of a control plane and a data plane for configuring and interfacing to a configurable hardware platform.

FIG. 5 shows further details of an example system 500 including components of a control plane and a data plane for configuring and interfacing to a configurable hardware platform 510. The control plane includes software and hardware functions for initializing, monitoring, reconfiguring, and tearing down the configurable hardware platform 510. The data plane includes software and hardware functions for communicating between a user's application and the configurable hardware platform 510. The control plane can be accessible by users or services having a higher privilege level and the data plane can be accessible by users or services having a lower privilege level. In one embodiment, the configurable hardware platform 510 is connected to a server computer 520 using a local interconnect, such as PCIe. In an alternative embodiment, the configurable hardware platform 510 can be integrated within the hardware of the server computer 520. As one example, the server computer 520 can be one of the plurality of server computers 402A-402B of the compute service provider 400 of FIG. 4.

The server computer 520 has underlying hardware 522 including one or more CPUs, memory, storage devices, interconnection hardware, etc. Running a layer above the hardware 522 is a hypervisor or kernel layer 524. The hypervisor or kernel layer can be classified as a type 1 or type 2 hypervisor. A type 1 hypervisor runs directly on the host hardware 522 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management partition 530 (such as Domain 0 of the Xen hypervisor) can be part of the hypervisor or separated therefrom and generally includes device drivers needed for accessing the hardware 522. User partitions 540 are logical units of isolation within the hypervisor. Each user partition 540 can be allocated its own portion of the hardware layer's memory, CPU allocation, storage, interconnect bandwidth, etc. Additionally, each user partition 540 can include a virtual machine and its own guest operating system. As such, each user partition 540 is an abstract portion of capacity designed to support its own virtual machine independent of the other partitions.

The management partition 530 can be used to perform management services for the user partitions 540 and the configurable hardware platform 510. The management partition 530 can communicate with web services (such as a deployment service, a logic repository service 550, and a health monitoring service) of the compute service provider, the user partitions 540, and the configurable hardware platform 510. The management services can include services for launching and terminating user partitions 540, and configuring, reconfiguring, and tearing down the configurable logic of the configurable hardware platform 510. As a specific example, the management partition 530 can launch a new user partition 540 in response to a request from a deployment service (such as the deployment component 426 of FIG. 4). The request can include a reference to an MI and/or a CHI. The MI can specify programs and drivers to load on the user partition 540 and the CHI can specify configuration data to load on the configurable hardware platform 510. The management partition 530 can initialize the user partition 540 based on the information associated with the MI and can cause the configuration data associated with the CHI to be loaded onto the configurable hardware platform 510. The initialization of the user partition 540 and the configurable hardware platform 510 can occur concurrently so that the time to make the instance operational can be reduced.

The management partition 530 can be used to manage programming and monitoring of the configurable hardware platform 510. By using the management partition 530 for this purpose, access to the configuration data and the configuration ports of the configurable hardware platform 510 can be restricted. Specifically, users with lower privilege levels can be restricted from directly accessing the management partition 530. Thus, the configurable logic cannot be modified without using the infrastructure of the compute services provider and any third party IP used to program the configurable logic can be protected from viewing by unauthorized users.

The management partition 530 can include a software stack for the control plane to configure and interface to a configurable hardware platform 510. The control plane software stack can include a configurable logic (CL) application management layer 532 for managing the configurable regions of one or more configurable hardware platforms connected to the server computer 520. In particular, the CL application management layer 532 can track the regions (such as regions 516A and 516B) and their current status. For example, the status can indicate whether the region is in use or not in use. When a request to load an application logic design onto the configurable hardware platform 510 is received, the CL application management layer 532 can select a region that is available to be configured with the application logic design, and the CL application management layer 532 can request configuration data corresponding to the selected region. When the instance using the application logic design is terminated or the application logic design is torn down, the CL application management layer 532 can change the status of the region corresponding to the application logic design to be unused so that the region can be reused by another instance or for a different application logic design. Additionally, the CL application management layer 532 can manage bandwidth allocation and apportionment of the address space of any peripherals of the configurable hardware platform 510. As a specific example, the bandwidth and address space can default to an even division of the bandwidth and address space among the different regions of the configurable hardware platform 510.

The CL application management layer 532 can be used for communicating with web services (such as the logic repository service 550 and a health monitoring service), the configurable hardware platform 510, and the user partitions 540. For example, the CL application management layer 532 can issue a request to the logic repository service 550 to fetch configuration data in response to a user partition 540 being launched. The CL application management layer 532 can communicate with the user partition 540 using shared memory of the hardware 522 or by sending and receiving inter-partition messages over the interconnect connecting the server computer 520 to the configurable hardware platform 510. Specifically, the CL application management layer 532 can read and write messages to mailbox logic 511 of the configurable hardware platform 510. The messages can include requests by an end-user application 541 to reconfigure or tear-down a region of the configurable hardware platform 510. The CL application management layer 532 can issue a request to the logic repository service 550 to fetch configuration data in response to a request to reconfigure the configurable hardware platform 510. The CL application management layer 532 can initiate a tear-down sequence in response to a request to tear down the configurable hardware platform 510. The CL application management layer 532 can perform watchdog related activities to determine whether the communication path to the user partition 540 is functional.

The control plane software stack can include a CL configuration layer 534 for accessing the configuration port 512 (e.g., a configuration access port) of the configurable hardware platform 510 so that configuration data can be loaded onto the configurable hardware platform 510. For example, the CL configuration layer 534 can send a command or commands to the configuration port 512 to perform a full or partial configuration of the configurable hardware platform 510. The CL configuration layer 534 can send the configuration data (e.g., a bitstream) to the configuration port 512 so that the configurable logic can be programmed according to the configuration data. The configuration data can specify host logic and/or application logic.

The control plane software stack can include a management driver 536 for communicating over the physical interconnect connecting the server computer 520 to the configurable hardware platform 510. The management driver 536 can encapsulate commands, requests, responses, messages, and data originating from the management partition 530 for transmission over the physical interconnect. Additionally, the management driver 536 can de-encapsulate commands, requests, responses, messages, and data sent to the management partition 530 over the physical interconnect. Specifically, the management driver 536 can communicate with the management function 513 of the configurable hardware platform 510. For example, the management function 513 can be a physical or virtual function mapped to an address range during an enumeration of devices connected to the physical interconnect. The management driver 536 can communicate with the management function 513 by addressing transactions to the address range assigned to the management function 513.

The control plane software stack can include a CL management and monitoring layer 538. The CL management and monitoring layer 538 can monitor and analyze transactions occurring on the physical interconnect to determine a health of the configurable hardware platform 510 and/or to determine usage characteristics of the configurable hardware platform 510.

The configurable hardware platform 510 can include non-configurable hard macros and configurable logic. The hard macros can perform specific functions within the configurable hardware platform 510, such as input/output blocks (e.g., serializer and deserializer (SERDES) blocks and gigabit transceivers), analog-to-digital converters, memory control blocks, test access ports, and a configuration port 512. The configurable logic can be programmed or configured by loading configuration data onto the configurable hardware platform 510. For example, the configuration port 512 can be used for loading the configuration data. As one example, configuration data can be stored in a memory (such as a Flash memory) accessible by the configuration port 512 and the configuration data can be automatically loaded during an initialization sequence (such as during a power-on sequence) of the configurable hardware platform 510. Additionally, the configuration port 512 can be accessed using an off-chip processor or an interface within the configurable hardware platform 510.

The configurable logic can be programmed to include host logic and one or more application logic designs. The host logic can shield the interfaces of at least some of the hard macros from the end-users so that the end-users have limited access to the hard macros and to the physical interconnect. For example, the host logic can include the mailbox logic 511, the configuration port 512, the management function 513, the host interface 514, and the application function 515. The host logic can encapsulate and shield one application design from another application design so that multiple application designs can concurrently operate on the configurable hardware platform 510. The end-users can cause the application logic to be loaded into one of the configurable regions 516A-B of the configurable hardware platform 510. The end-users can communicate with the configurable regions 516A-B from the user partitions 540 (via the application functions 515A-B). Specifically, a first user partition can communicate with the configurable region 516A using the application function 515A and a second user partition can communicate with the configurable region 516B using the application function 515B.

The host interface logic 514 can include circuitry (e.g., hard macros and/or configurable logic) for signaling on the physical interconnect and implementing a communications protocol. The communications protocol specifies the rules and message formats for communicating over the interconnect. Additionally, the host interface logic 514 can apportion the bandwidth of outgoing transactions between the application functions 515A-B. The application functions 515A-B can be used to communicate with drivers of the user partitions 540A-C. Specifically, each of the application functions 515A-B can be a physical or virtual function mapped to an address range during an enumeration of devices connected to the physical interconnect. The application drivers can communicate with one of the application functions 515A-B by addressing transactions to the address range assigned to the given application function 515A-B. Specifically, the application functions 515A-B can communicate with an application logic management driver 542 to exchange commands, requests, responses, messages, and data over the control plane. Each of the application functions 515A-B can communicate with an application logic data plane driver 543 to exchange commands, requests, responses, messages, and data over the data plane.

The mailbox logic 511 can include one or more buffers and one or more control registers. For example, a given control register can be associated with a particular buffer and the register can be used as a semaphore to synchronize between the management partition 530 and the user partition 540. As a specific example, if a partition can modify a value of the control register, the partition can write to the buffer. The buffer and the control register can be accessible from both the management function 513 and the application functions 515A-B. When the message is written to the buffer, another control register (e.g., the message ready register) can be written to indicate the message is complete. The message ready register can polled by the partitions to determine if a message is present, or an interrupt can be generated and transmitted to the partitions in response to the message ready register being written.

The user partition 540 can include a software stack for interfacing an end-user application 540 to the configurable hardware platform 510. The application software stack can include functions for communicating with the control plane and the data plane. Specifically, the application software stack can include a CL-Application API 544 for providing the end-user application 540 with access to the configurable hardware platform 510. The CL-Application API 544 can include a library of methods or functions for communicating with the configurable hardware platform 510 and the management partition 530. For example, the end-user application 541 can send a command or data to the configurable application logic 516 by using an API of the CL-Application API 544. In particular, the API of the CL-Application API 544 can interface with the application logic (AL) data plane driver 543 which can generate a transaction targeted to one of the application functions 515A-B which can communicate with the corresponding configurable application logic 516A-B. In this manner, the end-user application 541 can cause the application logic to receive, process, and/or respond with data to potentially accelerate tasks of the end-user application 541. As another example, the end-user application 541 can send a command or data to the management partition 530 by using an API of the CL-Application API 544. In particular, the API of the CL-Application API 544 can interface with the AL management driver 542 which can generate a transaction targeted to one of the application functions 515A-B which can communicate with the mailbox logic 511. In this manner, the end-user application 541 can cause the management partition 530 to provide operational or metadata about the configurable hardware platform 510 and/or to request that the configurable application logic 516A-B be reconfigured.

The application software stack in conjunction with the hypervisor or kernel 524 can be used to limit the operations available to perform over the physical interconnect by the end-user application 541. For example, the compute services provider can provide the AL management driver 542, the AL data plane driver 543, and the CL-Application API 544 (such as by associating the files with a machine image). These components can be protected from modification by only permitting users and services having a higher privilege level than the end-user to write to the files. The AL management driver 542 and the AL data plane driver 543 can be restricted to using only addresses within the address range of a corresponding application function 515A-B. Additionally, an input/output memory management unit (I/O MMU) can restrict interconnect transactions to be within the address ranges of the corresponding application function 515A-B or the management function 513. As a specific example, the user partition 540A can be assigned to use the application function 515A and its corresponding configurable region for application logic 516A. The user partition 540B can be assigned to use the application function 515B and its corresponding configurable region for application logic 516B. The I/O MMU can enforce access restrictions so that the user partition 540A can only write to the application function 515A, the application function 515A can only write to the user partition 540A, the user partition 540B can only write to the application function 515B, and the application function 515B can only write to the user partition 540B.

Figure 6:
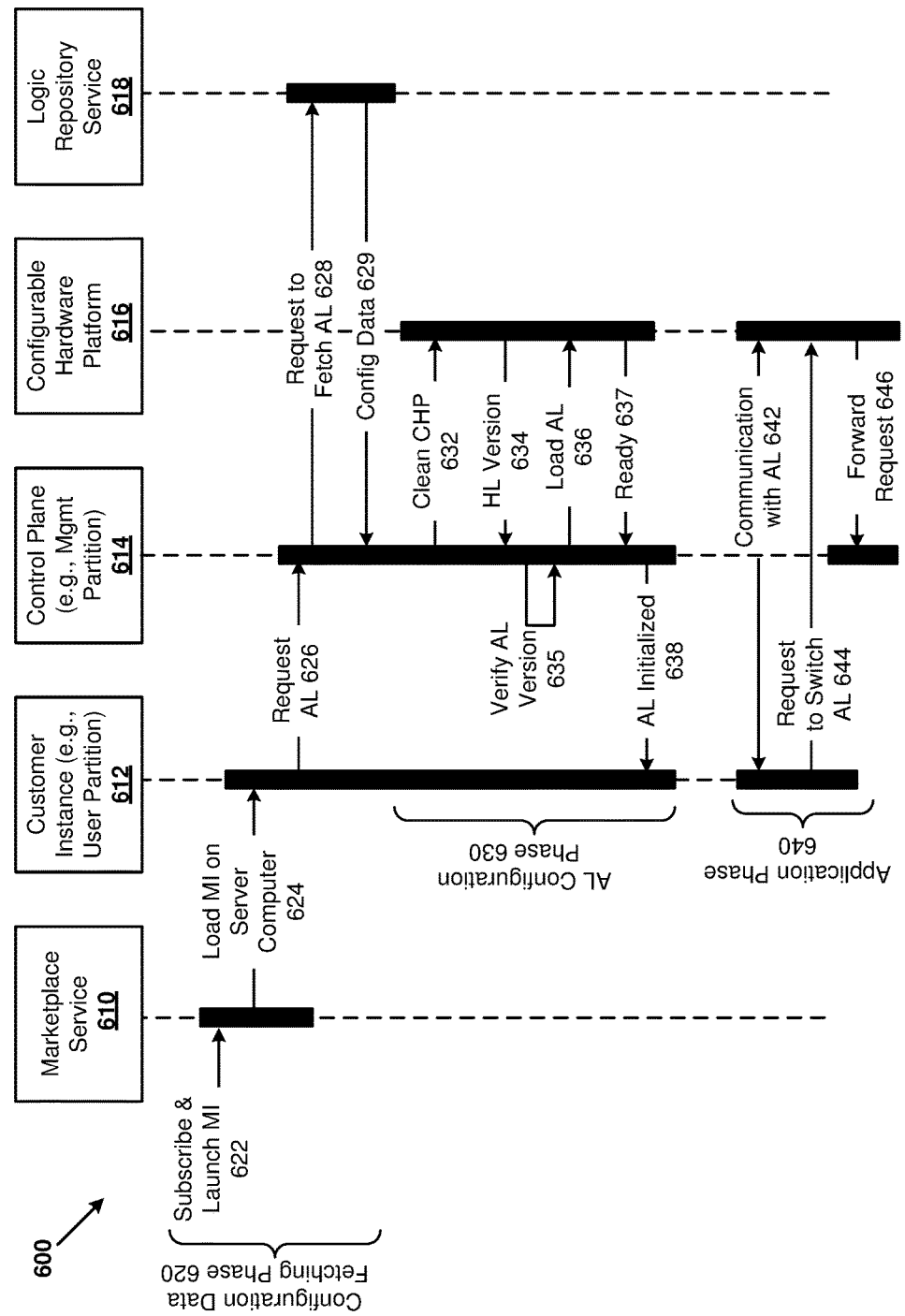
FIG. 6 is a sequence diagram of an example method of fetching, configuring, and using configuration data for configurable hardware in a multi-tenant environment.

FIG. 6 is a sequence diagram of an example method 600 of fetching configuration data, configuring an instance of configurable hardware in a multi-tenant environment using the configuration data, and using the instance of the configurable hardware. The sequence diagram illustrates a series of steps used by different elements of the compute services infrastructure that are used to configure the configurable logic. As one example, the infrastructure components of the compute services provider can include a marketplace 610, a customer instance 612, a control plane 614, a configurable hardware platform 616, and a logic repository service 618. The marketplace service 610 can receive configuration data for hardware accelerators created by end-users or by independent hardware developers that provide or market their accelerators to end-users of the compute services provider. The marketplace service 610 can provide a listing of accelerators that are available for purchase or for licensing so that end-users can find a hardware accelerator suited for their needs. The customer instance 612 can be a server computer and its associated software that is launched in response to an end-user deploying resources of the compute services provider. The customer instance can include control plane software 614, which can be used to manage the configuration of the configurable hardware platform 616. The configurable hardware platform 616 can include reconfigurable logic and host logic, as described above. The logic repository service 618 can include a repository of configuration data that can be indexed by product codes, machine instance identifiers, and/or configurable hardware identifiers, for example. The logic repository service 618 can receive a request for configuration data using one of the indexes, and can return the configuration data to the control plane.

The components of the compute service provider infrastructure can be used at various phases during the deployment and use of a customer instance 612. For example, the phases can include a configuration data fetching phase 620, an application logic configuration phase 630, and an application phase 640.

The configuration data fetching phase 620 can include identifying an application logic design and a reconfigurable region for placing the application logic. Configuration data for the application logic and corresponding to the reconfigurable region can be fetched from a logic repository service 618. Specifically, an end-user of the compute services can subscribe and launch 622 a machine instance using the marketplace service 610. The marketplace service 610 can cause a machine image to be loaded 624 on a server computer at so that a customer instance 612 can initialized. The machine image can include application software written and/or used by the end-user and control plane software provided by the compute services provider. While a virtual machine instance is being booted for the customer, a request 626 for application logic can be sent to the control plane 614. The control plane 614 can map the application logic to a particular unused region or area of the configurable hardware platform 616. By having the control plane 614 select the reconfigurable region, the details of selecting the region can be abstracted away from the customer instance 612. The control plane 614 can then send a request to fetch 628 configuration data corresponding to the application logic and the reconfigurable region from the logic repository service 618. The logic repository service 618 can reply 629 with the configuration data. Thus, the control plane software at 614 can receive a copy of configuration data corresponding to the application logic so that the application logic can be loaded onto the configurable hardware platform to configure the selected region of the configurable hardware platform.

The configuration phase 630 can include loading the configuration data onto the configurable hardware platform 616. The configuration phase 630 can include cleaning 632 the configurable hardware platform. For example, cleaning 632 the configurable hardware platform can include writing to any external memories (e.g., the public peripherals) in communication with the configurable hardware platform and/or internal memories (e.g., block RAMs) so that a prior customer's data is not observable by the present customer. Cleaning 632 the memories can include writing all zeroes, writing all ones, and/or writing random patterns to the storage locations of the memories. Additionally, the configurable logic memory of the configurable hardware platform 616 can be fully or partially scrubbed. After the configurable hardware platform 616 is cleaned, a host logic version that is loaded on the configurable hardware platform 616 can be returned 634 to the control plane 614. The host logic version can be used to verify 635 whether the application logic is compatible with the host logic that is loaded on the configurable hardware platform 616. If the host logic and application logic are not compatible, then the configuration phase 630 can abort (not shown). Alternatively, if the host logic and the application logic are compatible, then the configuration phase 630 can continue at 636. The application logic can be copied from the control plane 614 to the configurable hardware platform 616 so that the application logic can be loaded 636 into the selected region of the configurable hardware platform 616. After loading 636, the configurable hardware platform 616 can indicate 637 that the functions (e.g., the application logic) loaded on the configurable hardware platform 616 are ready. The control plane 614 can indicate 638 to the customer instance 612 that the application logic is initialized and ready for use.

The application phase 640 can begin after the application logic is initialized. The application phase 640 can include executing the application software on the customer instance 612 and executing the application logic on the configurable hardware platform 616. In particular, the application software of the customer instance 612 can be in communication 642 with the application logic of the configurable hardware platform 616. For example, the application software can cause data to be transferred to the application logic, the data can be processed by the application logic, and the processed data and/or status information can be returned to the application software. The application logic can include specialized or customized hardware that can potentially accelerate processing speed compared to using only software on a general purpose computer. The application logic can perform the same functions for the duration of the customer instance 612 or the application logic can be adapted or reconfigured while the customer instance 612 is executing. For example, the application software executing on the customer instance 612 can request that different application logic be loaded onto the configurable hardware platform 616. In particular, the application software can issue a request 644 to the configurable hardware platform 616 which can forward 646 the request to the control plane 614. The control plane 614 can begin fetching the new application logic at 628 from the logic repository service 618. When new application logic is loaded onto a running customer instance, the cleaning 632 step can be omitted since the customer is not changing for the customer instance 612.

Additionally, a tear-down phase (not shown) can be used to clear or clean the configurable hardware platform 616 so that customer data is further protected. For example, the internal and/or external memories of the configurable hardware platform 616 can be scrubbed and/or the configuration logic memories associated with the application logic can be scrubbed as part of a tear-down sequence when a customer stops using the customer instance 612. Specifically, the internal memories, external memories, and/or configuration logic memories can be overwritten with all zeroes, all ones, random values, and/or predefined values. For example, the configuration logic memories can be written with values that configure the reconfigurable logic to be in a low-power state.

Figure 7:
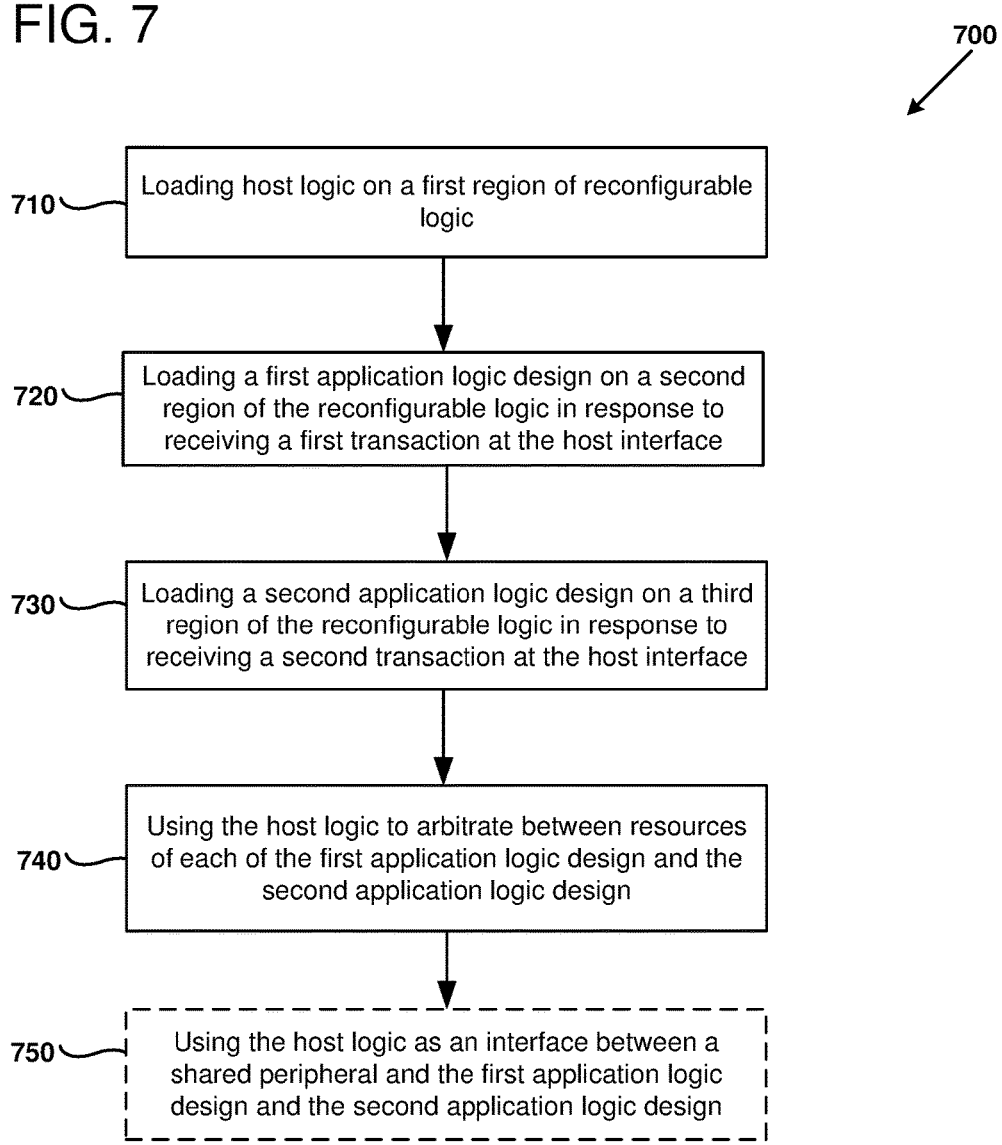
FIG. 7 is a flow diagram of an example method of using a configurable hardware platform.

FIG. 7 is a flow diagram of an example method 700 of using a configurable hardware platform. At 710, host logic can be loaded on a first region of reconfigurable logic so that the configurable hardware platform performs operations of the host logic. The host logic can include a control plane function used for enforcing restricted access for transactions from a host interface. For example, the control plane function can reject transactions that are outside of an address range assigned to the control plane function. Additionally, the host logic can include logic for limiting or restricting the application logic from using hard macros of the configurable hardware platform and accessing the physical interfaces to a host device. Thus, the host logic can encapsulate the application logic so that the interfaces to hard macros and to other components of the computing infrastructure are managed by the host logic.

The host logic can be loaded at one time or incrementally. For example, the host logic can include static logic that is loaded upon deassertion of a reset signal of the configurable hardware platform. As a specific example, configuration data corresponding to the static logic can be stored in a flash memory of the configurable hardware platform, and the contents of the flash memory can be used to program the configurable hardware platform with the static host logic. In one embodiment, the static logic can be loaded without intervention by a host computer (e.g., a customer instance). Additionally or alternatively, the host logic can include reconfigurable logic that is loaded after the static logic is loaded. For example, the reconfigurable host logic can be added while the static host logic is operating. In particular, the reconfigurable host logic can be loaded upon receiving a transaction requesting that the reconfigurable host logic be loaded. For example, the transaction can be transmitted from a host computer over a physical interconnect connecting the configurable hardware platform to the host computer.

By dividing the host logic into a static logic component and a reconfigurable logic component, the host logic can be incrementally loaded onto the configurable hardware platform. For example, the static logic can include base functionality of the host logic, such as communication interfaces, enumeration logic, and configuration management logic. By providing the communication interfaces in the static logic, the configurable hardware platform can be discovered or enumerated on the physical interconnect as the computing system is powered on and/or is reset. The reconfigurable logic can be used to provide updates to the host logic and to provide higher-level functionality to the host logic. For example, some interconnect technologies have time limits for enumerating devices attached to the interconnect. The time to load host logic onto the configurable hardware platform can be included in the time budget allotted for enumeration and so the initial host logic can be sized to be loaded relatively quickly. Thus, the static logic can be a subset of the host logic functionality so that the configurable hardware platform can be operational within the time limits specified by the interconnect technology. The reconfigurable logic can provide additional host logic functionality to be added after the enumeration or boot up sequence is complete. As one example, host logic that is associated with the data plane (such as a DMA engine, CHP fabric, peripheral fabric, or a public peripheral interface) can be loaded as reconfigurable logic after the static logic has been loaded.

At 720, a first application logic design can be loaded on a second region of the reconfigurable logic in response to receiving a first transaction at the host interface. The second region of the reconfigurable logic can be non-overlapping with the first region of the reconfigurable logic so that the host logic is not modified. Additionally, the second region of the reconfigurable logic can have an interface to static host logic. The host logic can analyze the first transaction to ensure that the first transaction satisfies access criteria of the control plane function before the first application logic design is loaded. If the access criteria of the control plane is satisfied, the first application logic design can be loaded. The first transaction can satisfy the access criteria by having an address within a given range of addresses, or by including an authorization token, for example. For example, the first transaction can include an address corresponding to a control register of the host logic to initiate loading the application logic. As another example, an authorization token can be verified by the host logic to determine whether the request is authorized.

At 730, a second application logic design can be loaded on a third region of the reconfigurable logic in response to receiving a second transaction at the host interface. The third region of the reconfigurable logic can be non-overlapping with the first and second regions of the reconfigurable logic so that the host logic and the first application logic design are not modified. Additionally, the third region of the reconfigurable logic can have an interface to static host logic. The second and third regions can be isolated from each other so that there is no direct communication path between the second and third regions. Similar to the first transaction, the host logic can analyze the second transaction to ensure that the second transaction satisfies access criteria of the control plane function before the second application logic design is loaded.

At 740, the host logic can be used to arbitrate between resources of each of the first application logic design and the second application logic design. As one example, the host logic can be used to control an amount of bandwidth used by each of the first application logic design and the second application logic design when transmitting information from the host interface. For example, the host logic can include a formatting and control layer between the host interface and each of the application logic designs. In particular, the formatting and control layer can include a streaming interface for receiving data from each of the application logic designs. The streamed data can be partitioned (e.g., packetized) and formatted so that the data can be transmitted from the host interface. The formatting and control layer can partition the streamed data into different sized blocks so that latency and bandwidth usage of the host interface can be managed. For example, the formatting and control layer can track the amount of data transmitted from the host interface that originates from each of the application logic designs, and the formatting and control layer can arbitrate between the different application logic designs so that the bandwidth can be apportioned between the different application logic designs. As a specific example, the bandwidth can be equally divided between the different application logic designs. As another example, the apportionment of the bandwidth can be specified using control registers that are accessible from the control plane function of the host logic. The bandwidth can be apportioned based on raw bandwidth (e.g., including the bandwidth for sending control information of the transaction) or effective bandwidth which accounts for only the data that is transmitted. By interposing the formatting and translation layer between the host interface and the application logic designs, the security and availability of the host computer can potentially be increased because the application logic designs can be restricted from directly creating transactions and/or viewing transactions of the physical interconnect or different application logic designs. Thus, the use of the formatting and translation layer can protect the integrity and privacy of transactions occurring on the physical interconnect.

As another example, the host logic can be used to control an amount of internal or external resources used by each of the first application logic design and the second application logic design. As a specific example, the host logic can be used to control an amount of energy or power used by each of the application logic designs. In particular, the configurable hardware platform can have a limited power budget that can be divided between the different application logic designs. The host logic can estimate an energy consumption of each application design based on a size (e.g., gate count) of the design and a frequency of one or more clocks of the design. Alternatively, an estimated energy consumption can be loaded into control registers of the host logic when each of the application logic designs are loaded onto the configurable hardware platform. The host logic can be used to control the energy consumed by each of the application logic designs so that the application logic designs conform to the power budget of the configurable hardware platform. Controlling the energy consumed by an application logic design can include gating or changing the frequency of one or more clocks of the application logic design, and gating the power or changing the voltage of all or a portion of the application logic design.

At 750, the host logic can be used as an interface between a shared peripheral and the first application logic design and the second application logic design. As described above, the shared peripherals can include memory, storage devices, and/or other configurable hardware platforms. The interface can format all transfers between the shared peripheral and the application logic designs so that the application logic designs are not burdened with conforming to low-level details of the transfer protocol and so that shared peripherals are not misused (such as by causing a malfunction or accessing privileged information). The host logic can apportion bandwidth of data transfers between the shared peripheral and the first application logic design and the second application logic design. For example, the bandwidth can be apportioned based on a fixed apportionment (e.g., equally weighted) or a programmed apportionment. The host logic can enforce a size of data transfers between the shared peripheral and the first application logic design and the second application logic design. As one example, a latency of the transfers may be reduced by decreasing the size of the data transfers. As another example, an effective bandwidth or utilization may be increased by increasing the size of the data transfers.

The shared peripheral can include multiple functions, registers, and/or storage locations that are indexed by different respective addresses within a range of addresses assigned to the shared peripheral. The different functions, registers, and/or storage locations can be divided between the different application logic designs so that each application logic design can have exclusive access to different portions of the shared peripheral. For example, the addresses of the shared peripheral can be divided into multiple address ranges, and each application logic design can be given access to a different address range. In particular, the host logic can restrict access from the first application logic design to a first range of addresses of the shared peripheral and can restrict access from the second application logic design to a second range of addresses of the shared peripheral. Alternatively or additionally, the shared peripheral can have shared functions, registers, and/or storage locations. Thus, each application logic design can be granted access to a private portion (accessible using one range of addresses) and a shared portion (accessible using a different range of addresses) of the shared peripheral.

The host logic can also be used to analyze transactions of the application logic designs. For example, the host logic can track operational characteristics, such as bandwidth, latency, and other performance characteristics of the application logic designs and/or the host logic. As another example, the host logic can analyze transactions to determine if the transactions conform to predefined criteria. If the transactions do not conform to the criteria, then the host logic can potentially cancel transactions originating at the application logic designs.

Figure 8:
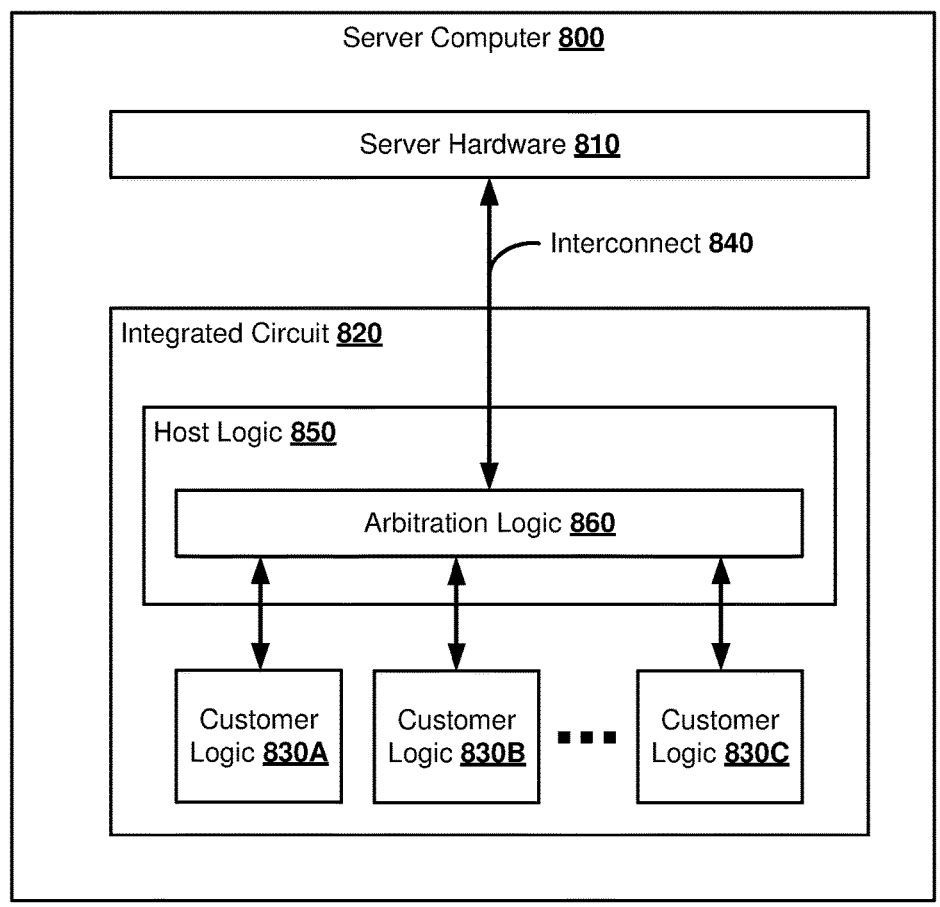
FIG. 8 is a system diagram showing an example of a server computer including an integrated circuit with multiple customer logic designs configured on the integrated circuit.

FIG. 8 is a system diagram showing an example of a server computer 800 including server hardware 810 and an integrated circuit 820 with multiple customer logic designs 830A-C configured on the integrated circuit 820. The server hardware 810 can include a CPU, memory, connectors, interfaces, power supplies, fans, and various other hardware components. The integrated circuit 820 can include reconfigurable logic that can be programmed or configured to perform a computing task. For example, the integrated circuit 820 can be an FPGA, CPLD, or other programmable hardware device. The integrated circuit 820 can be connected to the server hardware 810 using an interconnect 840 that provides a low latency communication path between the server hardware 810 and the integrated circuit 820. For example, the integrated circuit 820 and the server hardware 810 can communicate by sending signals over an interconnect using a communications protocol such as PCI, PCI- Express, or other bus or serial interconnect protocol. As one example, the server hardware 810 and the integrated circuit 820 can be connected to a motherboard of the server computer 800. As another example, the integrated circuit 820 can be mounted on an expansion card that is inserted into an expansion slot of the server computer 800. By tightly coupling the server hardware 810 and the integrated circuit 820 using a low latency interconnect, the integrated circuit 820 can be used as a hardware accelerator for many compute-intensive applications executing on the server hardware 810. In contrast, a hardware accelerator connected over a higher latency interconnect, such as an Ethernet or Internet Protocol (IP) network may provide fewer opportunities to accelerate applications because of the communications overhead between the server hardware and the hardware accelerator.

The integrated circuit 820 can include host logic 850 and multiple customer logic designs 830A-C. The host logic 850 can be logic that is deployed by a compute service provider to enforce a level of device manageability and security. The host logic 850 can include static logic and reconfigurable logic. For example, the static logic can be loaded at boot time from an on-board flash memory device. The host reconfigurable logic can be loaded after boot time (e.g., at run-time) using an internal or external flash memory device and a dedicated microcontroller, or a by the server hardware 810 over the interconnect 840. The host logic 850 can be used to protect the server computer 800 from attacks initiated by the customer logic designs 830A-C. Specifically, the host logic 850 encapsulates or sandboxes the customer logic designs 830A-C by owning or controlling the interface to the interconnect 840. As a specific example, the interconnect 840 can be PCI-Express and the host logic 850 can protect the server computer 800 from PCI-Express-level attacks because the host logic 850 owns the PCI-Express interface of the integrated circuit 820 and controls the PCI-Express addresses and the PCI-Express bus, device, function, and alternative routing identifier.

The host logic 850 can include arbitration logic 860 that can be used for apportioning resources (such as bandwidth over the interconnect 840) between the different customer logic designs 830A-C. For example, each of the customer logic designs 830A-C can be operated by different customers. The compute service provider can use the host logic 850 to load the customer logic designs 830A-C onto different respective reconfigurable logic regions of the integrated circuit 820. The arbitration logic 860 can provide a consistent quality of service to each customer by providing the different customers access to the interconnect 840 at different times. Specifically, each customer can be given access to the interconnect 840 in a round-robin or other scheduled order. The arbitration logic 860 can limit the bandwidth provided to each customer logic design 830A-C to a specified amount of bandwidth. For example, if the integrated circuit 820 includes four different reconfigurable logic regions for customer logic designs, the arbitration logic 860 can limit the bandwidth provided to each customer logic design to one-fourth of the available bandwidth of the interconnect 840. In this manner, the customers cannot interfere with one another, such as by using up all of the available bandwidth, and the customers cannot directly or indirectly observe whether other customers are executing customer logic designs on the integrated circuit 820. For example, the customers cannot reliably use latency or bandwidth between the integrated circuit 820 and the server computer 810 to observe whether other customers are executing customer logic designs on the integrated circuit 820.

Figure 9:
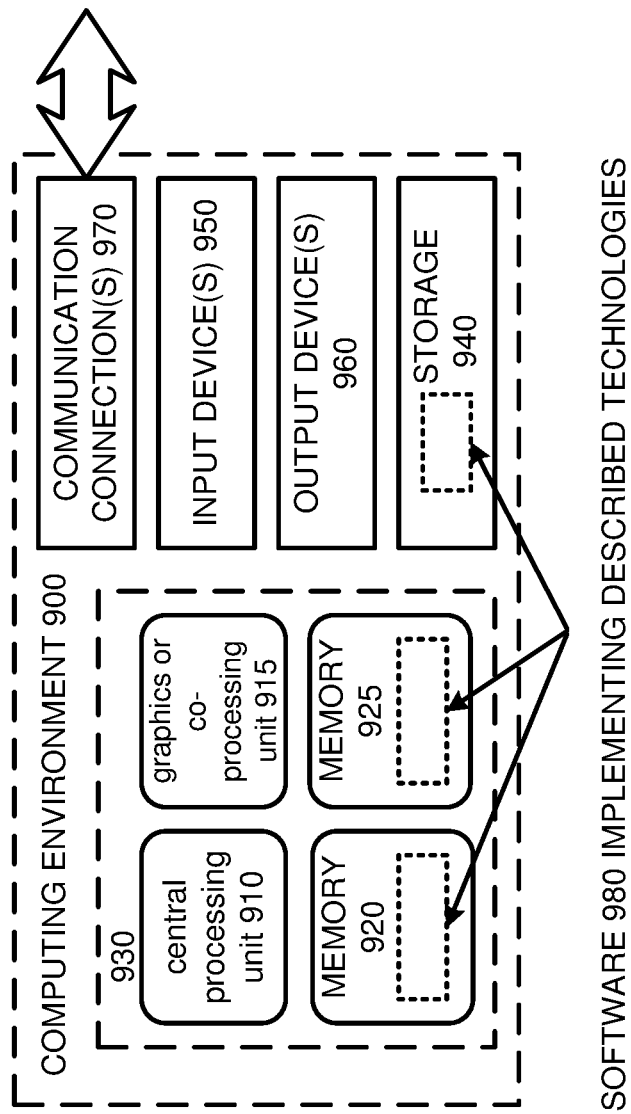
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.)

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A configurable logic platform comprising:
   a physical interconnect for connecting the configurable logic platform to a processor;
   a first reconfigurable logic region comprising logic blocks that are configured based on configuration data corresponding to the first reconfigurable logic region;
   a second reconfigurable logic region comprising logic blocks that are configured based on configuration data corresponding to the second reconfigurable logic region;
   a configuration port for applying the configuration data to the first and second reconfigurable logic regions so that the first reconfigurable logic region is configured based on the configuration data corresponding to the first reconfigurable logic region and the second reconfigurable logic region is configured based on the configuration data corresponding to the second reconfigurable logic region;
   a control plane function accessible via transactions of the physical interconnect, the control plane function in communication with the configuration port, the control plane function providing restricted access to the configuration port from the physical interconnect;
   a first data plane function accessible via transactions of the physical interconnect, the first data plane function providing an interface to the first reconfigurable logic region which allows information to be transmitted over the physical interconnect and prevents the first reconfigurable logic region from directly accessing the physical interconnect;
   a second data plane function accessible via transactions of the physical interconnect, the second data plane function providing an interface to the second reconfigurable logic region which allows information to be transmitted over the physical interconnect and prevents the second reconfigurable logic region from directly accessing the physical interconnect; and
   arbitration logic configured to apportion bandwidth of the physical interconnect among at least the first data plane function and the second data plane function.

2. The configurable logic platform of claim 1, wherein the first data plane function is accessed using a transaction comprising an address within a first address range, the second data plane function is accessed using a transaction comprising an address within a second address range, the control plane function is accessed using a transaction comprising an address within a third address range, and the first, second, and third address ranges are all non-overlapping.

3. The configurable logic platform of claim 1, further comprising:
a public peripheral interface configured to provide a first communication path between the first reconfigurable logic region and a public peripheral and a second communication path between the second reconfigurable logic region and a public peripheral.

4. The configurable logic platform of claim 3, wherein the public peripheral interface is configured to restrict access by the first reconfigurable logic region to addresses of the public peripheral within a first address range, and the public peripheral interface is configured to restrict access by the second reconfigurable logic region to addresses of the public peripheral within a second address range.

5. The configurable logic platform of claim 3, wherein the public peripheral interface is configured to restrict the first reconfigurable logic region to a first amount of bandwidth for transfers between the public peripheral and the first reconfigurable logic region, and the public peripheral interface is configured to restrict the second reconfigurable logic region to a second amount of bandwidth for transfers between the public peripheral and the second reconfigurable logic region.

6. The configurable logic platform of claim 1, wherein the arbitration logic is further configured to enforce a maximum transfer size of the first data plane function and the second data plane function.

7. The configurable logic platform of claim 1, wherein the bandwidth apportionment of the arbitration logic is configured by programming a value of a control register accessible via the control plane function.

8. The configurable logic platform of claim 3, wherein the public peripheral interface is adapted to format data transfers between the respective reconfigurable logic regions and the public peripheral.

9. The configurable logic platform of claim 1, wherein the control plane function is configured to clear one or more of an internal memory, an external memory, or a configuration memory in response to a request to tear down logic configured on the first reconfigurable logic region or the second reconfigurable logic region.

10. A server computer comprising:
a central processing unit; and
a configurable logic platform connected to the central processing unit, the configurable logic platform comprising:
a physical interconnect for connecting the configurable logic platform to the central processing unit;
a first reconfigurable logic region comprising logic blocks that are configured based on configuration data corresponding to the first reconfigurable logic region;
a second reconfigurable logic region comprising logic blocks that are configured based on configuration data corresponding to the second reconfigurable logic region;
a configuration port for applying the configuration data to the first and second reconfigurable logic regions so that the first reconfigurable logic region is configured based on the configuration data corresponding to the first reconfigurable logic region and the second reconfigurable logic region is configured based on the configuration data corresponding to the second reconfigurable logic region;
a control plane function accessible via transactions of the physical interconnect, the control plane function in communication with the configuration port, the control plane function providing restricted access to the configuration port from the physical interconnect;
a first data plane function accessible via transactions of the physical interconnect, the first data plane function providing an interface to the first reconfigurable logic region which allows information to be transmitted over the physical interconnect and prevents the first reconfigurable logic region from directly accessing the physical interconnect;
a second data plane function accessible via transactions of the physical interconnect, the second data plane function providing an interface to the second reconfigurable logic region which allows information to be transmitted over the physical interconnect and prevents the second reconfigurable logic region from directly accessing the physical interconnect; and
arbitration logic configured to apportion bandwidth of the physical interconnect among at least the first data plane function and the second data plane function.

11. The server computer of claim 10, wherein the first data plane function is accessed using a transaction comprising an address within a first address range, the second data plane function is accessed using a transaction comprising an address within a second address range, the control plane function is accessed using a transaction comprising an address within a third address range, and the first, second, and third address ranges are all non-overlapping.

12. The server computer of claim 10, wherein the configurable logic platform further comprises:
a public peripheral interface configured to provide a first communication path between the first reconfigurable logic region and a public peripheral and a second communication path between the second reconfigurable logic region and a public peripheral.

13. The server computer of claim 12, wherein the public peripheral interface is configured to restrict access by the first reconfigurable logic region to addresses of the public peripheral within a first address range, and the public peripheral interface is configured to restrict access by the second reconfigurable logic region to addresses of the public peripheral within a second address range.

14. The server computer of claim 12, wherein the public peripheral interface is configured to restrict the first reconfigurable logic region to a first amount of bandwidth for transfers between the public peripheral and the first reconfigurable logic region, and the public peripheral interface is configured to restrict the second reconfigurable logic region to a second amount of bandwidth for transfers between the public peripheral and the second reconfigurable logic region.

15. The server computer of claim 12, wherein the public peripheral interface is adapted to format data transfers between the respective reconfigurable logic regions and the public peripheral.

16. The server computer of claim 10, wherein the arbitration logic is further configured to enforce a maximum transfer size of the first data plane function and the second data plane function.

17. The server computer of claim 10, wherein the bandwidth apportionment of the arbitration logic is configured by programming a value of a control register accessible via the control plane function.

18. The server computer of claim 10, wherein the control plane function is configured to clear one or more of an internal memory, an external memory, or a configuration memory in response to a request to tear down logic configured on the first reconfigurable logic region or the second reconfigurable logic region.

19. An integrated circuit comprising:
a physical interconnect for connecting the integrated circuit to a processor;
a first reconfigurable logic region comprising logic blocks that are configured based on configuration data corresponding to the first reconfigurable logic region;
a second reconfigurable logic region comprising logic blocks that are configured based on configuration data corresponding to the second reconfigurable logic region;
a configuration port for applying the configuration data to the first and second reconfigurable logic regions so that the first reconfigurable logic region is configured based on the configuration data corresponding to the first reconfigurable logic region and the second reconfigurable logic region is configured based on the configuration data corresponding to the second reconfigurable logic region;
a control plane function accessible via transactions of the physical interconnect, the control plane function in communication with the configuration port, the control plane function providing restricted access to the configuration port from the physical interconnect;
a first data plane function accessible via transactions of the physical interconnect, the first data plane function providing an interface to the first reconfigurable logic region which allows information to be transmitted over the physical interconnect and prevents the first reconfigurable logic region from directly accessing the physical interconnect;
a second data plane function accessible via transactions of the physical interconnect, the second data plane function providing an interface to the second reconfigurable logic region which allows information to be transmitted over the physical interconnect and prevents the second reconfigurable logic region from directly accessing the physical interconnect; and
arbitration logic configured to apportion bandwidth of the physical interconnect among at least the first data plane function and the second data plane function.

20. The integrated circuit of claim 19, wherein the first data plane function is accessed using a transaction comprising an address within a first address range, the second data plane function is accessed using a transaction comprising an address within a second address range, the control plane function is accessed using a transaction comprising an address within a third address range, and the first, second, and third address ranges are all non-overlapping.

* * * * *